US012569927B2

(12) United States Patent
Clark

(10) Patent No.: US 12,569,927 B2
(45) Date of Patent: Mar. 10, 2026

(54) SPOT WELDING ASSEMBLY WITH PIVOTABLE ELECTRODES

(71) Applicant: MAGNA INTERNATIONAL INC., Aurora (CA)

(72) Inventor: Austin Clark, Bowling Green, OH (US)

(73) Assignee: MAGNA INTERNATIONAL INC., Aurora (CA)

( * ) Notice: Subject to any disclaimer, the term of this patent is extended or adjusted under 35 U.S.C. 154(b) by 961 days.

(21) Appl. No.: 17/706,932

(22) Filed: Mar. 29, 2022

(65) Prior Publication Data

US 2022/0219258 A1      Jul. 14, 2022

Related U.S. Application Data

(63) Continuation-in-part of application No. PCT/US2020/053228, filed on Sep. 29, 2020.

(60) Provisional application No. 63/209,029, filed on Jun. 10, 2021, provisional application No. 63/174,267, filed on Apr. 13, 2021, provisional application No. 63/167,947, filed on Mar. 30, 2021, provisional application No. 62/910,605, filed on Oct. 4, 2019.

(51) Int. Cl.
*B23K 11/11*          (2006.01)
*B23K 11/31*          (2006.01)

(52) U.S. Cl.
CPC ........... *B23K 11/115* (2013.01); *B23K 11/318* (2013.01)

(58) Field of Classification Search
CPC .. B23K 11/115; B23K 11/3009; B23K 11/318
USPC ........................................................ 219/89
See application file for complete search history.

(56) References Cited

U.S. PATENT DOCUMENTS

| | | | |
|---|---|---|---|
| 1,996,901 A | 4/1935 | Burns | |
| 2,346,088 A * | 4/1944 | Shobert | B23K 11/3009 219/85.14 |
| 2,523,367 A | 9/1950 | Holt | |
| 2,605,379 A * | 7/1952 | Mckay | B23K 3/0307 74/543 |
| 3,487,191 A | 12/1969 | Claas | |

(Continued)

FOREIGN PATENT DOCUMENTS

| | | | |
|---|---|---|---|
| CN | 103433595 | * | 12/2013 |
| JP | 2008213032 A | | 9/2008 |

OTHER PUBLICATIONS

EP Search Report for corresponding EP Application No. 20872796. 6-1103; Sep. 28, 2023; 6 pgs.

*Primary Examiner* — Ibrahime A Abraham
*Assistant Examiner* — Joseph W Iskra
(74) *Attorney, Agent, or Firm* — DICKINSON WRIGHT PPLC

(57)          ABSTRACT

A spot welding assembly for welding a first work piece to a second work piece. The spot welding assembly includes a base. A base electrode is coupled with the base for supporting the first work piece. A welding gun is moveable toward and away from the base. A gun electrode is coupled with the welding gun for supporting the second work piece and for locating the second work piece against the first work piece upon movement of the welding gun toward the base to allow the first and second work pieces to be welded to one another. The base electrode is rotatable and pivotable relative to the base, and the gun electrode is rotatable and pivotable relative to the welding gun.

20 Claims, 30 Drawing Sheets

(56)                    References Cited

U.S. PATENT DOCUMENTS

| 7,564,005 B2 | 7/2009 | Cabanaw et al. |
| 2006/0043074 A1 | 3/2006 | Sun et al. |

* cited by examiner

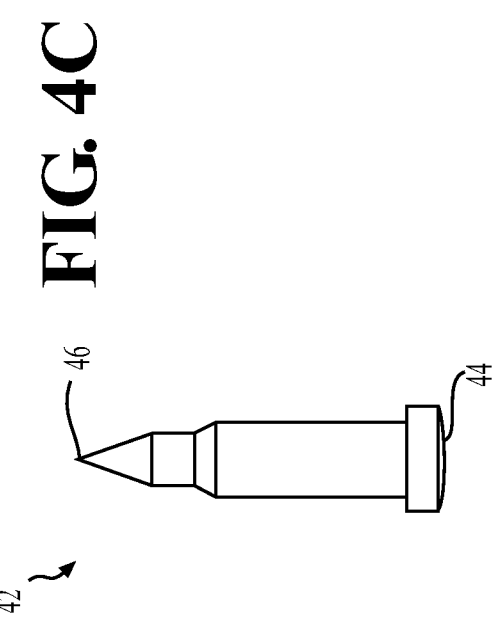
FIG. 4C
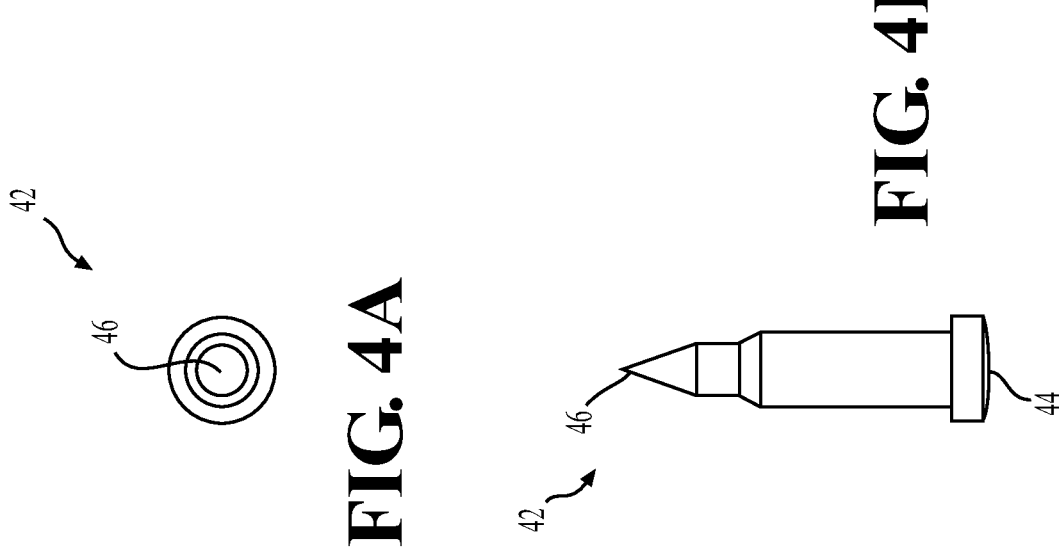
FIG. 4A
FIG. 4B

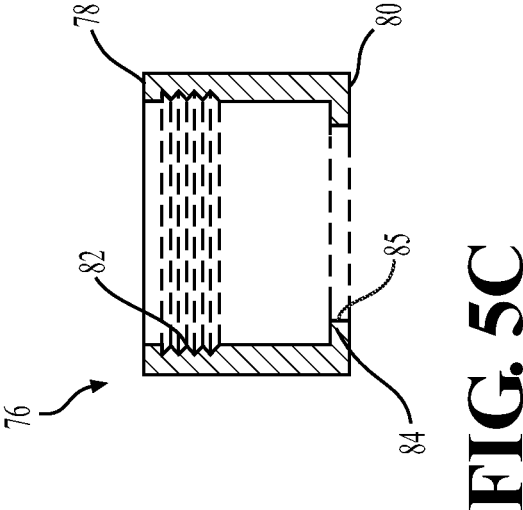
FIG. 5C
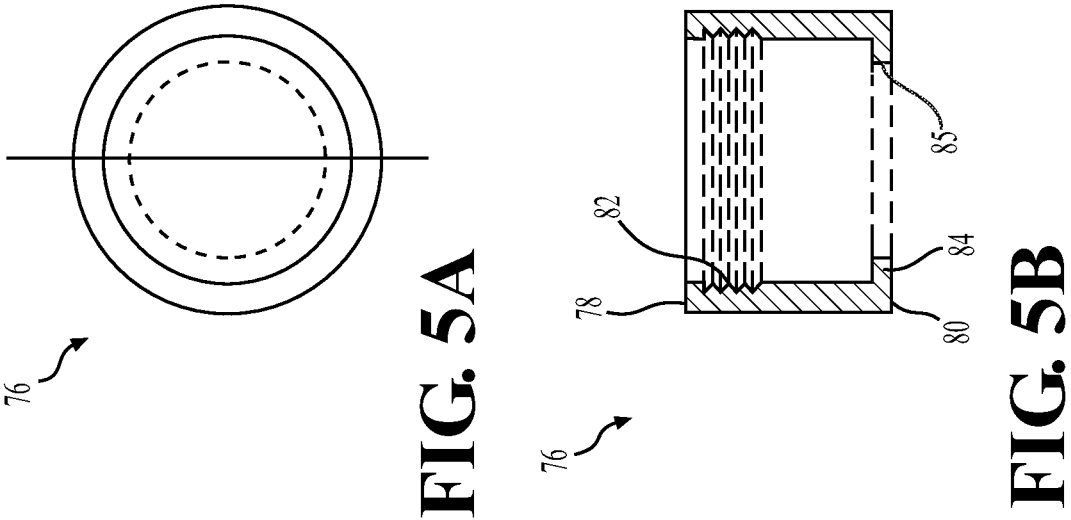
FIG. 5A
FIG. 5B

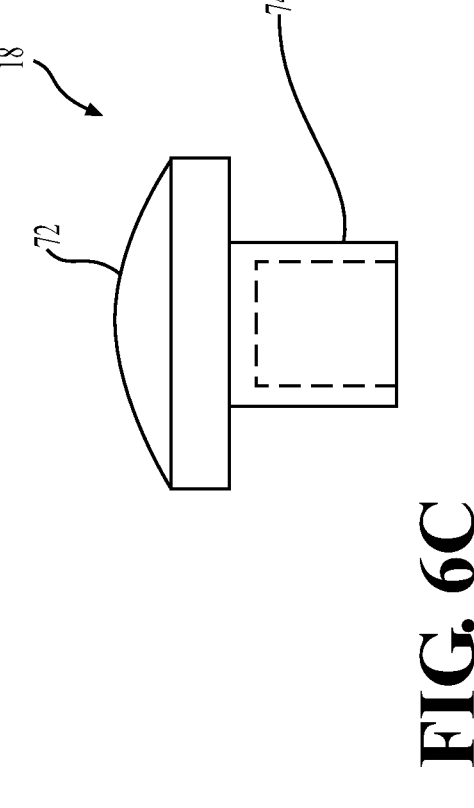
FIG. 6A
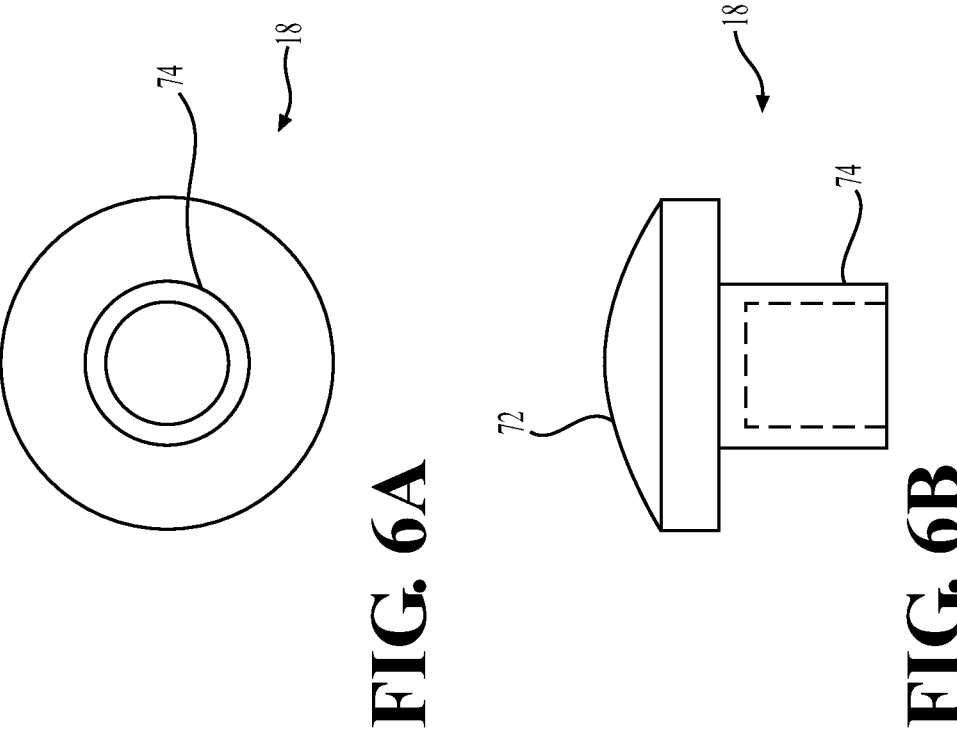
FIG. 6B
FIG. 6C

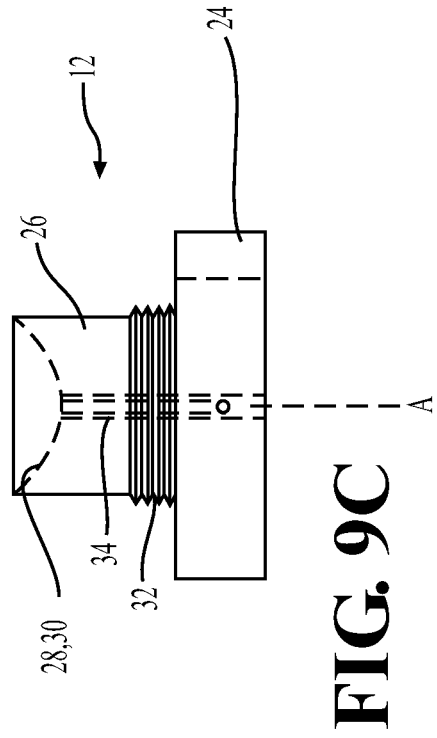
FIG. 9C
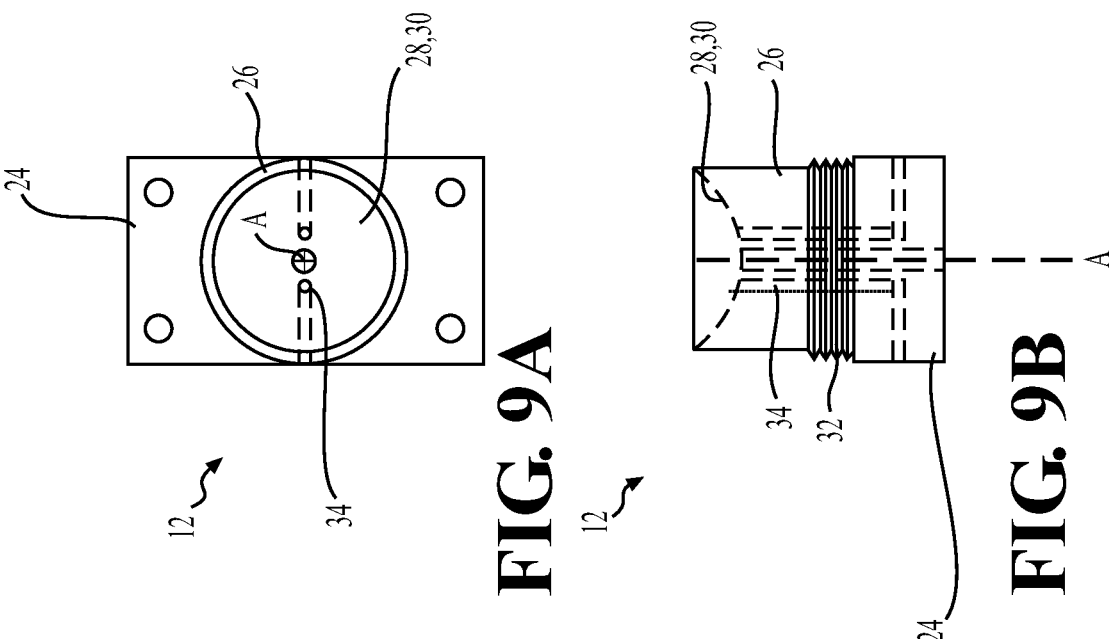
FIG. 9A
FIG. 9B

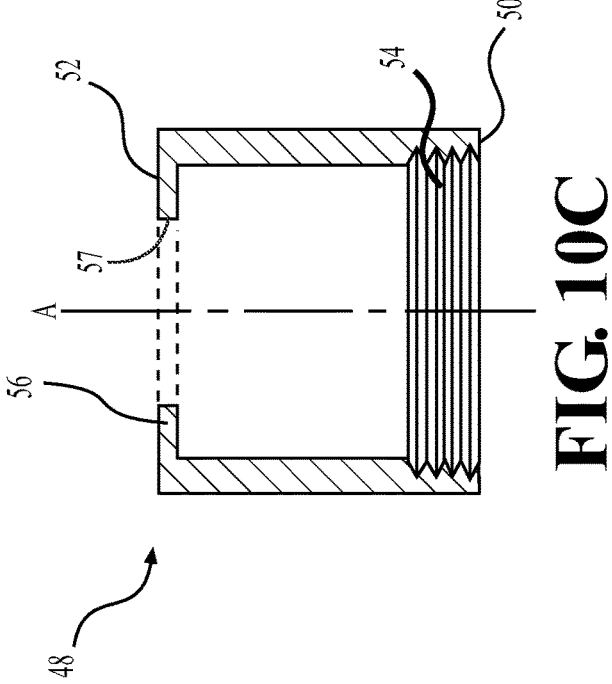
FIG. 10C
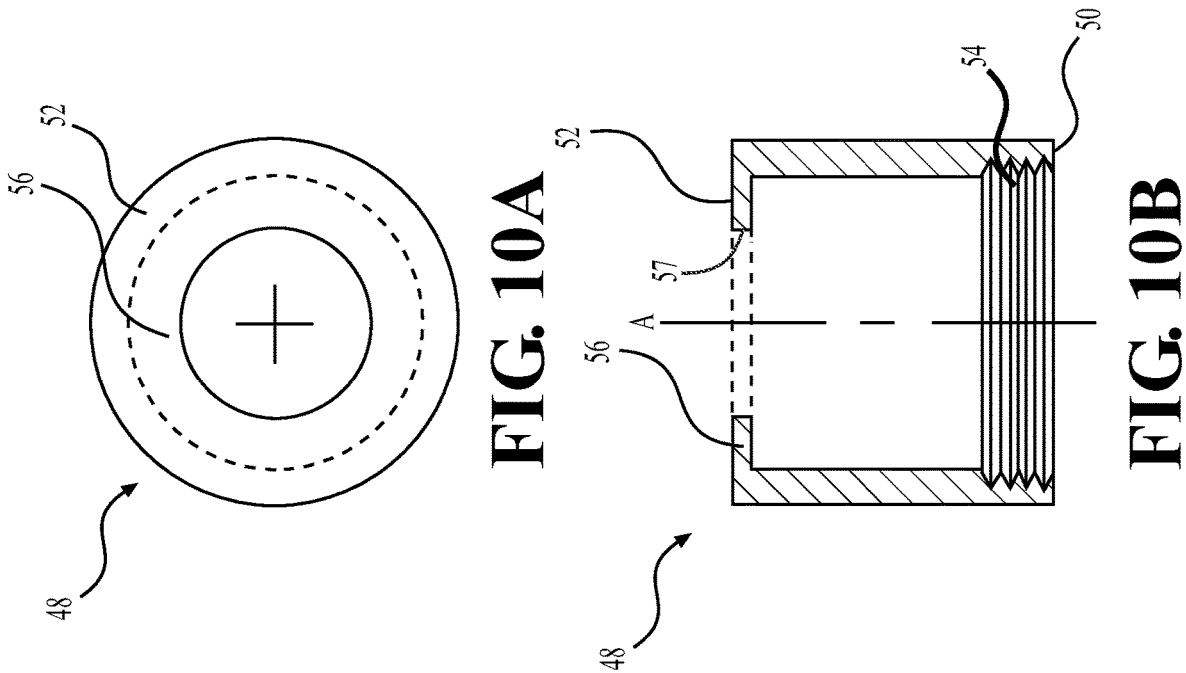
FIG. 10A
FIG. 10B

342

346

344

346

342

344

SPOT WELDING ASSEMBLY WITH PIVOTABLE ELECTRODES

CROSS-REFERENCE TO RELATED APPLICATIONS

The subject application is a bypass Continuation-in-Part Patent Application of PCT International Patent Application Serial No. PCT/US2020/053228 filed Sep. 29, 2020 entitled "SPOT WELDING ASSEMBLY WITH PIVOTABLE ELECTRODES" which claims the benefit of and priority to U.S. Provisional Patent Application Ser. No. 62/910,605 filed on Oct. 4, 2019, and titled "Spot Welding Assembly With Pivotable Electrodes." The subject application also claims the benefit of and priority to U.S. Provisional Patent Application Ser. No. 63/167,947 filed on Mar. 30, 2021, and titled "Spot Welding Assembly With Pivotable Electrodes," U.S. Provisional Patent Application Ser. No. 63/174,267 filed on Apr. 13, 2021, and titled "Spot Welding Assembly With Pivotable Electrodes," and U.S. Provisional Patent Application Ser. No. 63/209,029 filed on Jun. 10, 2021, and titled "Spot Welding Assembly With Pivotable Electrodes". The entire disclosures of all the aforementioned applications are hereby incorporated by reference.

TECHNICAL FIELD

The subject disclosure generally relates to welding assemblies. More particularly, the subject disclosure relates to a spot welding assembly with pivotable electrodes for accommodating variances in work pieces.

BACKGROUND OF THE DISCLOSURE

Spot welding assemblies are known in the art for welding first and second work pieces to one another. Spot welding assemblies typically include a base for supporting a base electrode and a welding gun for supporting a gun electrode. During a welding operation, the welding gun is moved toward the base in order to draw the first and second work pieces against one another. A current is then applied through the base and gun electrodes and the first and second work pieces in order to melt regions of at least one of the first work piece and/or the second work piece to form a weld therebetween.

An issue with such spot welding assemblies, especially when the welding process is automated, is that the electrodes are static, and thus do not compensate for variations in work piece placement and/or dimensional variations among the work pieces, especially when the work pieces are not arranged parallel to a welding surface defined between the first and second electrodes. As such, the first and/or second work piece may not make adequately contact the electrodes, thus leading to an insufficient weld. In these situations, it is known to manually adjust an orientation of the welding gun and/or base to provide improved contact against the work pieces, however, such manual adjustments can be time consuming and labor intensive.

In view of the foregoing, there remains a need for improvements to such spot welding assemblies.

SUMMARY OF THE INVENTION

According to an aspect of the disclosure, a spot welding assembly for welding a first work piece to a second work piece is provided. The spot welding assembly includes a base, and a base electrode coupled with the base for supporting the first work piece. A welding gun is moveable toward and away from the base. A gun electrode is coupled with the welding gun for supporting the second work piece and for locating the second work piece against the first work piece upon movement of the welding gun toward the base to allow the first and second work pieces to be welded to one another. At least one of: the base electrode is pivotable relative to the base; or the gun electrode is pivotable relative to the welding gun.

Because one or both of the base and/or the gun electrodes are pivotable, the electrode(s) are able to quickly be oriented flat against the work pieces even when the work pieces are not parallel to an original plane of the base and/or gun electrode(s), such as when the work pieces are improperly located or irregularly dimensioned. Orienting the electrode(s) in this manner ensure sufficient electrical and thermal conductivity during welding in order to provide a sufficient weld. Such adjustments may be provided in both automated and manual welding operations.

The subject spot welding assembly may be employed in projection welding applications, wherein at least one of the work pieces has at least one projection that engages the other work piece for focusing a current from the base and gun electrodes.

BRIEF DESCRIPTION OF THE DRAWINGS

Other advantages of the present invention will be readily appreciated, as the same becomes better understood by reference to the following detailed description when considered in connection with the accompanying drawings wherein:

FIGS. 4A-4C are top, front and side views of a weld pin of the spot welding assembly;

FIGS. 5A-5C are top, front and side views of an upper collar of the spot welding assembly;

FIGS. 6A-6C are top, front and side views of a gun electrode of the spot welding assembly;

FIGS. 9A-9C are top, front and side views of a base of the spot welding assembly;

FIGS. 10A-10C are top, front and side views of a retaining collar of the spot welding assembly;

DETAILED DESCRIPTION OF THE ENABLING EMBODIMENTS

Figure 1:
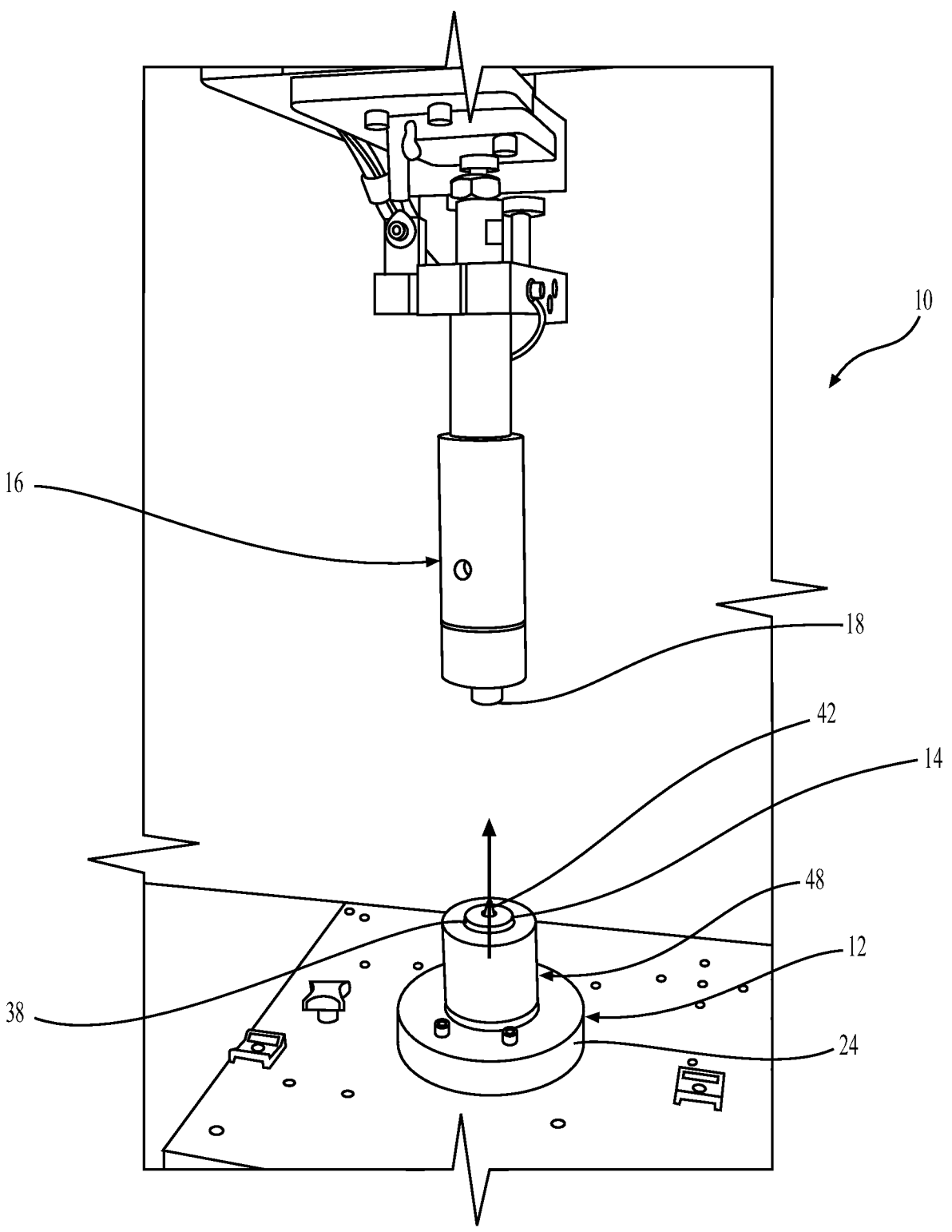
FIG. 1 is a perspective view of a spot welding assembly.

Referring to the Figures, wherein like numerals indicate correspond parts throughout the several views, a spot welding assembly 10 is generally shown. With reference to FIG. 1, the spot welding assembly 10 generally has a base 12 for supporting a base electrode 14, and a welding gun 16 for supporting a gun electrode 18. As shown in FIGS. 2A-2C, 11A-11B, 12A-12B and 15, a first work piece 20 and a second work piece 22 are positioned between the base and gun electrodes 14, 18. The first work piece 20 can be supported by tooling 23. With reference back to FIGS. 1 and 3A-3C, the welding gun 16 is moveable toward and away from the base 12 in order to make the first and second work pieces 20, 22 engage one another, after which a current is applied through the base and gun electrodes 14, 18 and the first and second work pieces 20, 22 in order to melt at least one of the first and/or second work pieces 20, 22 to form a weld therebetween. According to the example embodiment, the first work piece 20 is a flat plate and the second work piece 22 is a nut, but other types of work pieces may be utilized without departing from the scope of the subject disclosure. As presented in the example embodiment, the subject spot welding assembly 10 may specifically be a projection welding assembly, wherein at least one of the work pieces 20, 22 has one or more projections for concentrating the current from the base and gun electrodes 14, 18 in order to target the weld to specific areas.

As shown in FIGS. 1 and 9A-9C, the base 12 has a bottom portion 24 that is configured to be located on a die. The bottom portion 24 may have various shapes, such as a cylindrical shape (e.g., FIGS. 1-2C) or a cuboid shaped (e.g., FIGS. 9A-9C). As best shown in FIGS. 3A-3D and 9A-9C, the base 12 further has a generally cylindrical-shaped projection portion 26 that extends upwardly from the bottom portion 24 along an axis A and terminates at a top surface 28. The top surface 28 is concave shaped (concaving axially downwardly) to define a first hemispherical portion or surface 30 for the base 12. As illustrated in FIGS. 3A-3D, the concave shape of the top surface 28 of the base 12 is defined relative to a cross-sectional plane extending along the axis A. The projection portion 26 defines a plurality of first threads 32 adjacent to the bottom portion 24. A plurality of first wire channels 34 extend through the projection portion 26 to the top surface 28 for receiving one or more wires for transmitting a current to the base electrode 14. The first wire channels 34 are spaced apart and positioned so that at least one of the first wire channels 34 contacts a convex second hemispherical portion or surface 36 of the base electrode 14 that is disposed in mating relationship with the first hemispherical portion of the base 12 during any position throughout the base electrode's range of motion.

More specifically, as illustrated in FIGS. 3A-3D and 8A-8C, the base electrode 14 is pivotably and rotatably positioned against the first hemispherical portion or surface 30 of the base 12. According to the example embodiment, the base electrode is made of a class 2 copper material, but other highly conductive materials could be utilized. The base electrode 14 has a lower end being convex shaped, complementary to the concave shape of the first hemispherical portion or surface 30 of the base 12, to define a convex second hemispherical portion or surface 36 that mates and nests with the first hemispherical portion or surface 30 such that the second hemispherical portion or surface 36 is pivotable and rotatable 360 degrees relative to and along the first hemispherical portion or surface 30. The base electrode 14 further has a cylindrical projection 38 that extends upwardly from the second hemispherical portion or surface 36 to a flat upper welding surface 39 for supporting the first work piece 20. The base electrode 14 further defines a passage 40 that extends axially through the base electrode 12 from the upper, flat surface 39 to the lower, convex second hemispherical portion or surface 36. In other words the passage 40 extends to and is open at the convex second hemispherical portion of surface 36. (See e.g., FIGS. 3A-3D, 8A-8C, 29, and 36B).

Figure 3B:
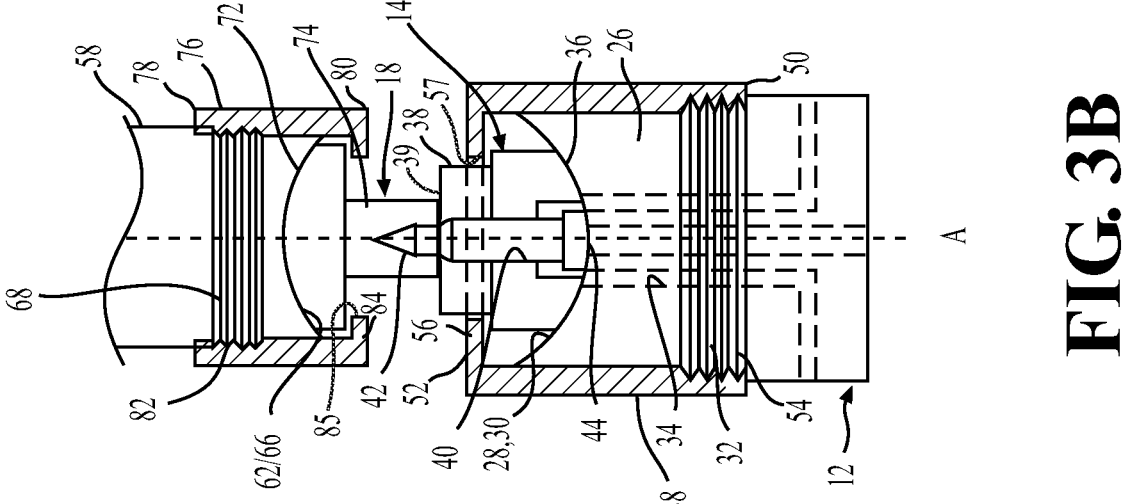
FIGS. 3A-3D are front partial views of base and gun electrodes of the spot welding assembly, illustrating the base and gun electrodes being pivoted in different directions.
Figure 3A:
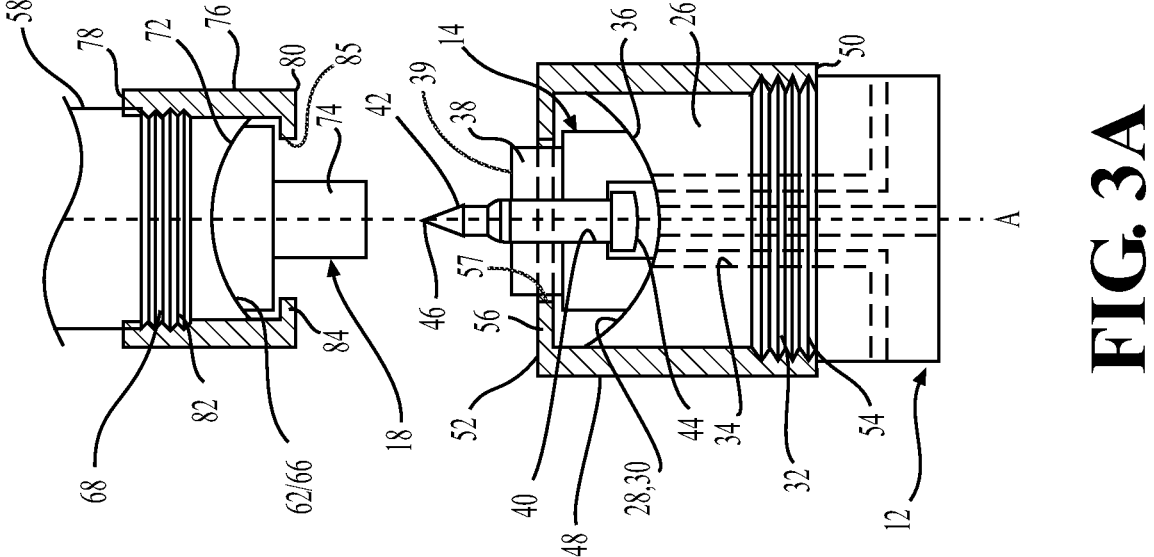
Figure 3D:
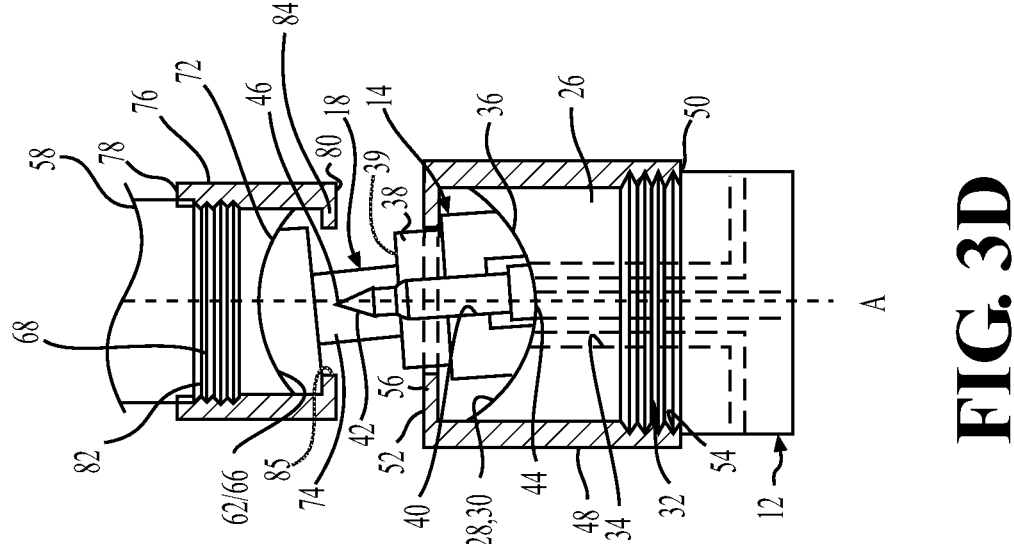
Figure 3C:
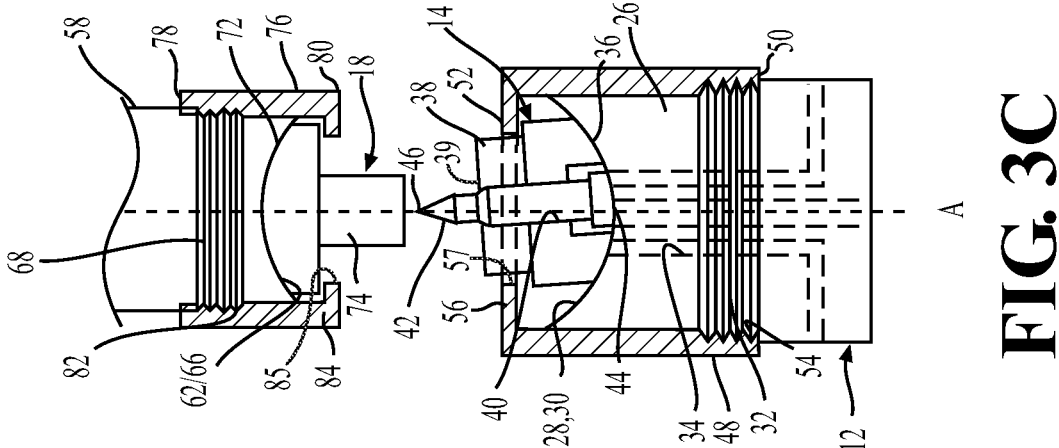
Figures 7A, 7B, 7C:
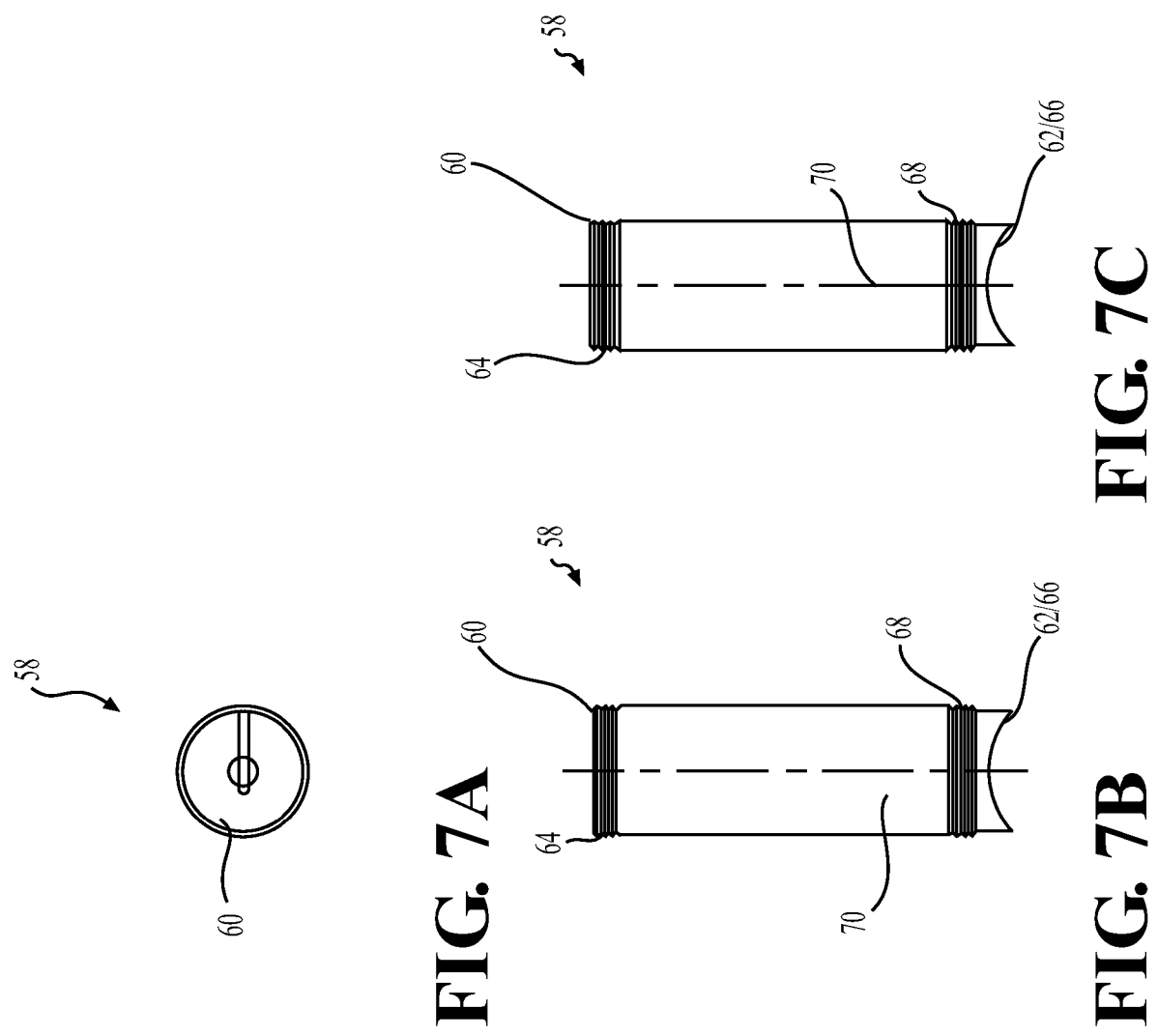
FIGS. 7A-7C are top, front and side views of an upper adapter of the spot welding assembly.
Figure 8C:
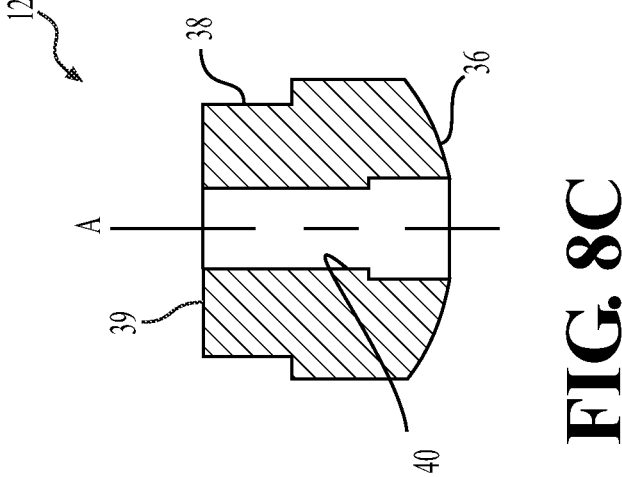
FIGS. 8A-8C are top, front and side views of a base electrode of the spot welding assembly.
Figure 8A:
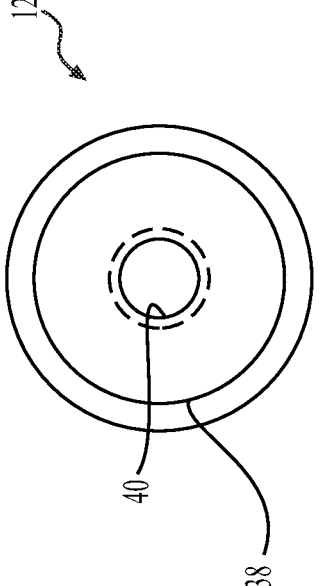
Figure 8B:
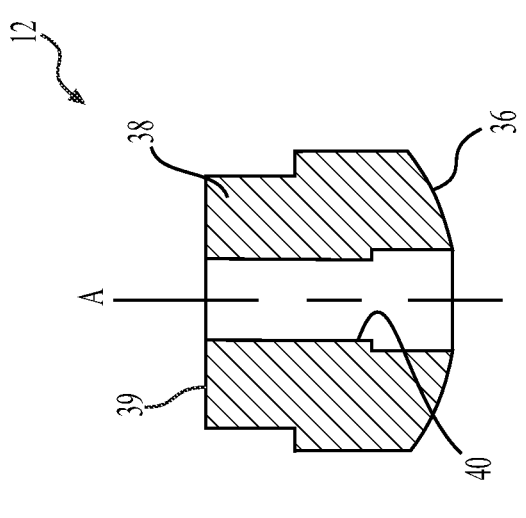
Figures 11A, 11B:
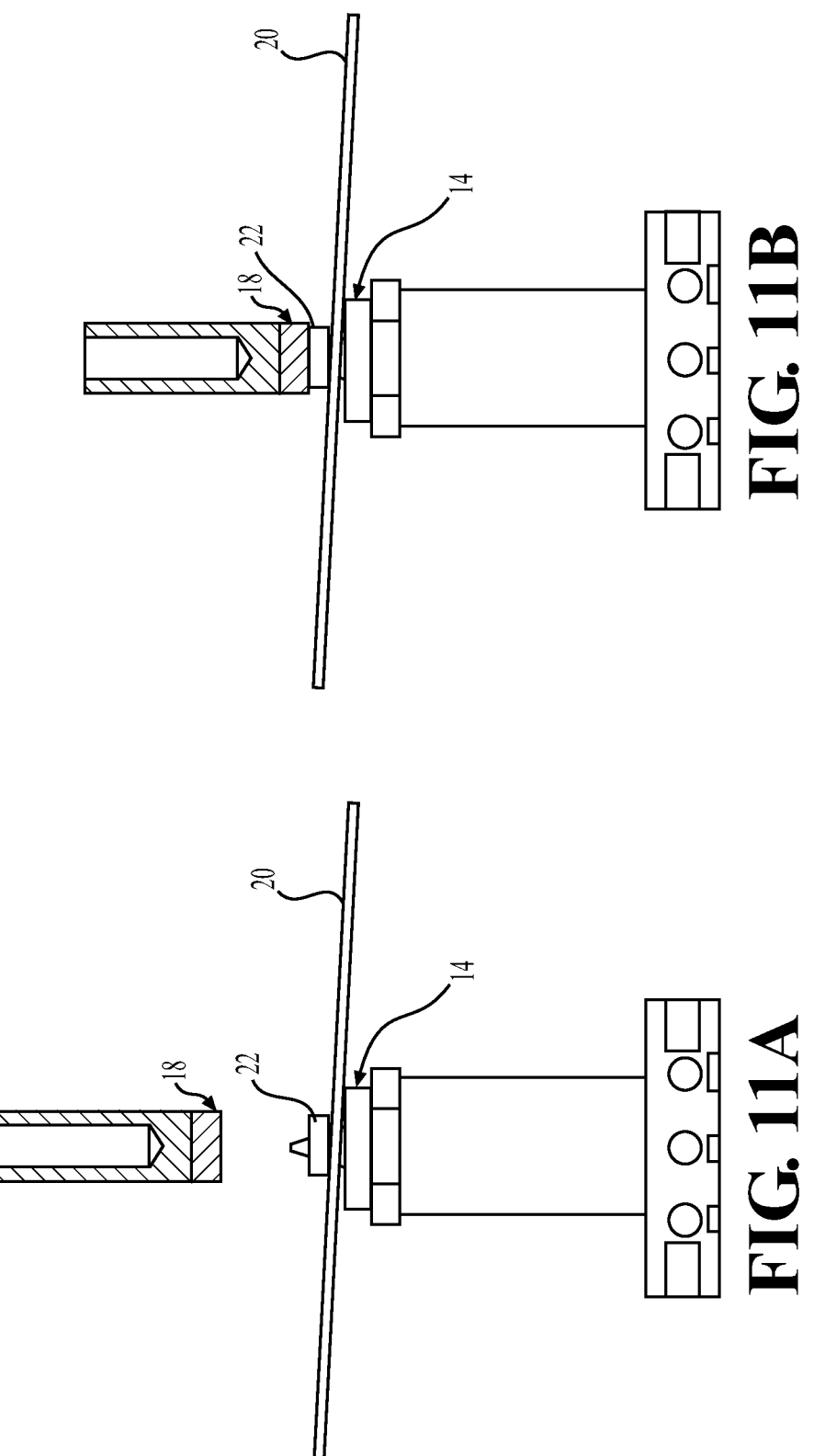
FIGS. 11A-11B are front partial views of the base and gun electrodes of the spot welding assembly, illustrating first and second work pieces being located between the base and gun electrodes in an automatic operation.
Figures 12A, 12B:
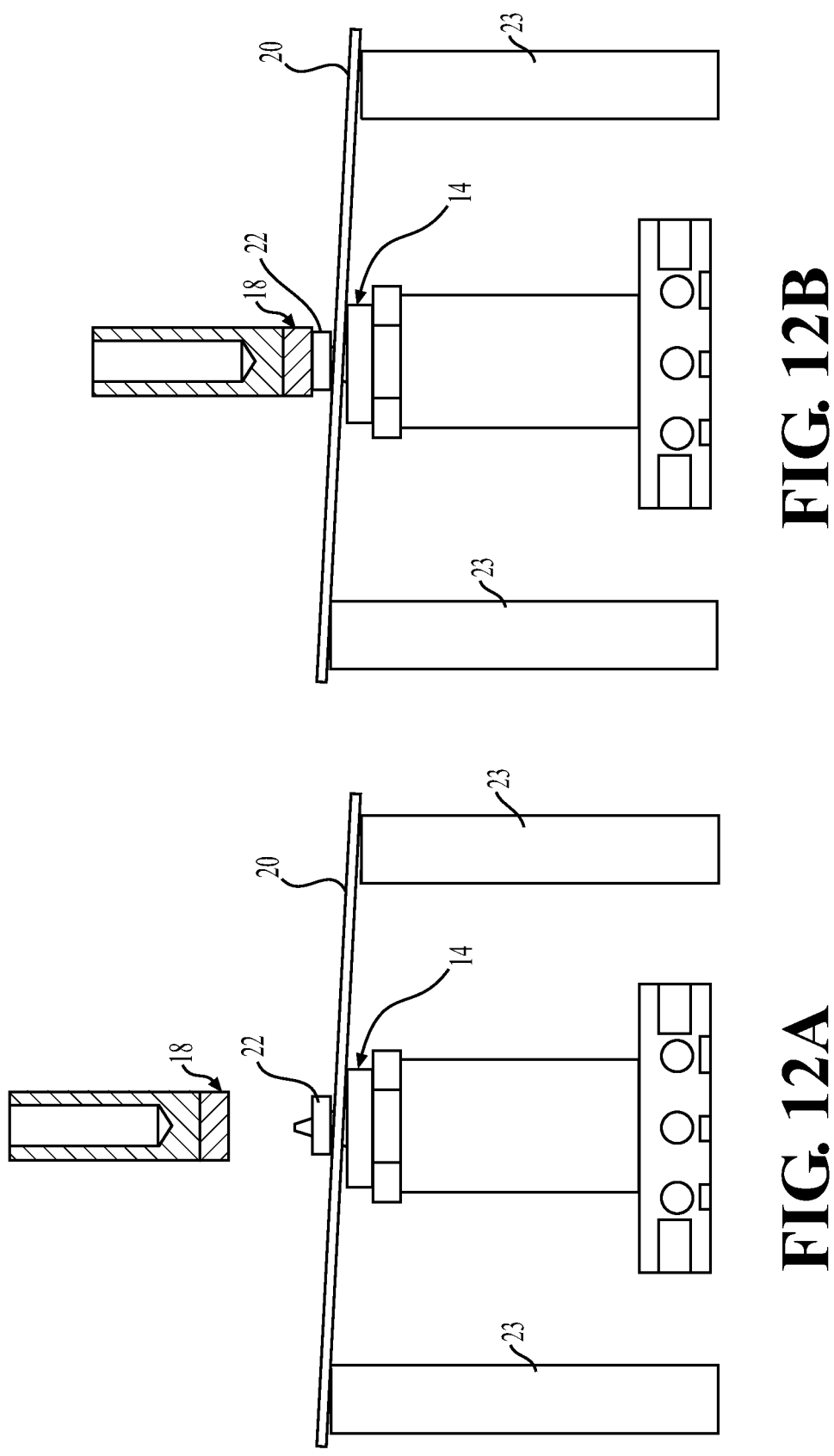
FIGS. 12A-12B are front partial views of the base and gun electrodes of the spot welding assembly, illustrating first and second work pieces being located between the base and gun electrodes in a manual operation.
Figures 13A, 13B, 13C:
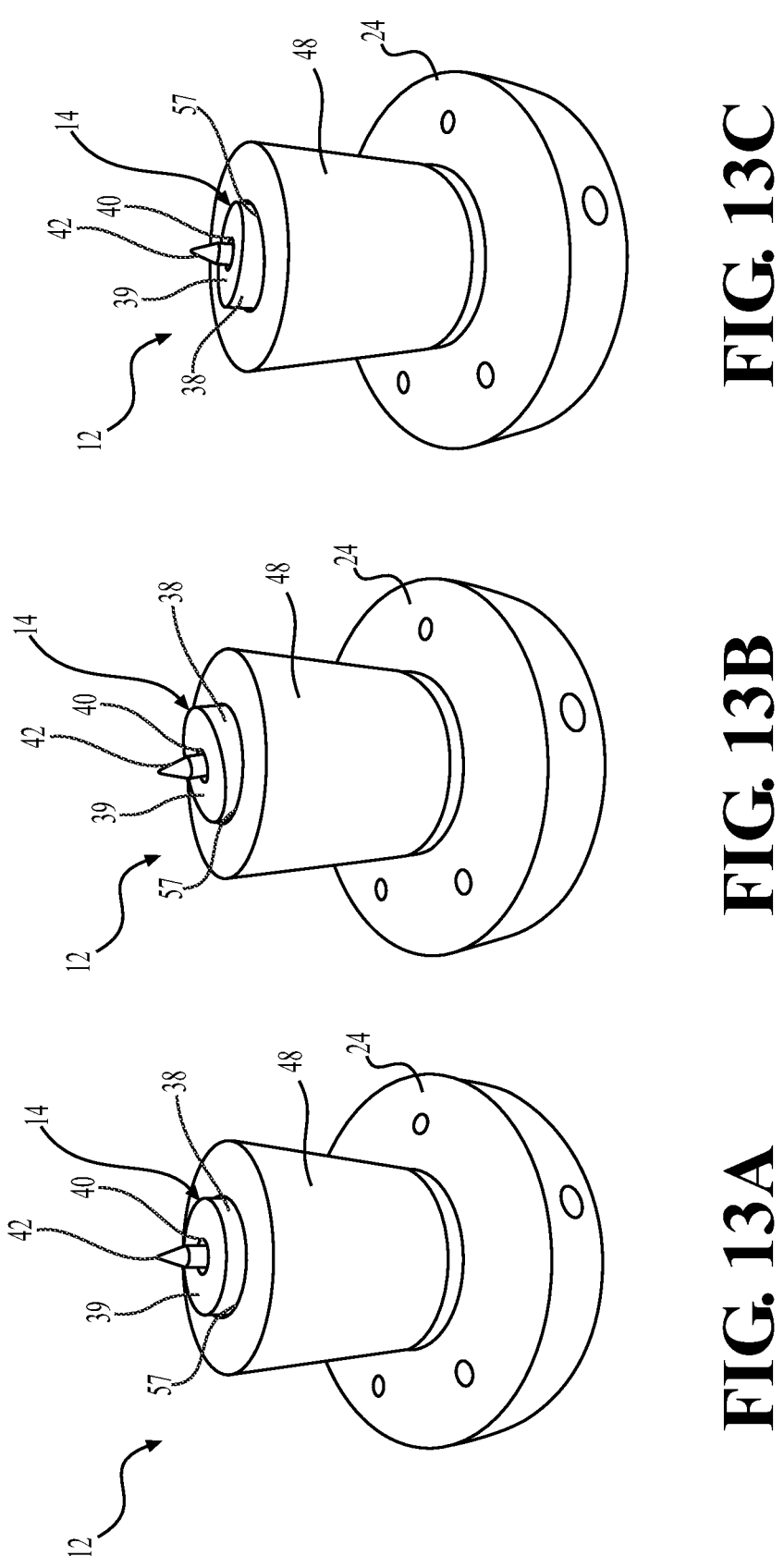
FIGS. 13A-13C are front perspective views of the base and base electrode of the spot welding assembly, illustrating the base electrode being pivoted into different positions.
Figure 14:
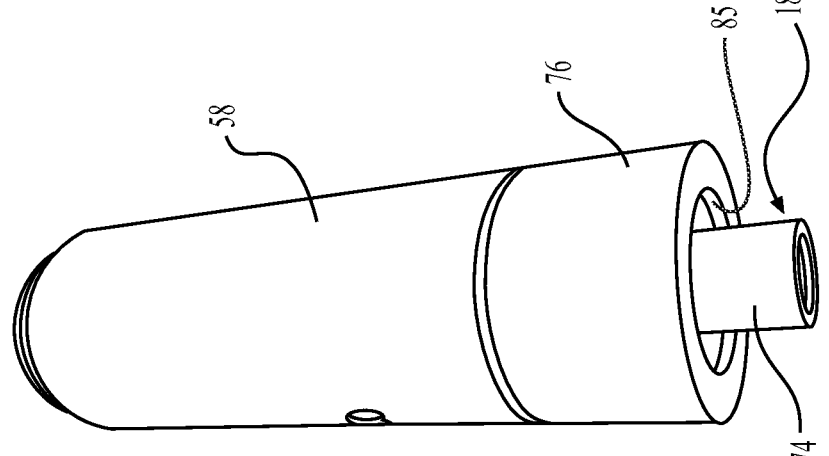
FIG. 14 is a front perspective view of the gun electrode of the spot welding assembly in a centered position.
Figure 14:
Figure 15:
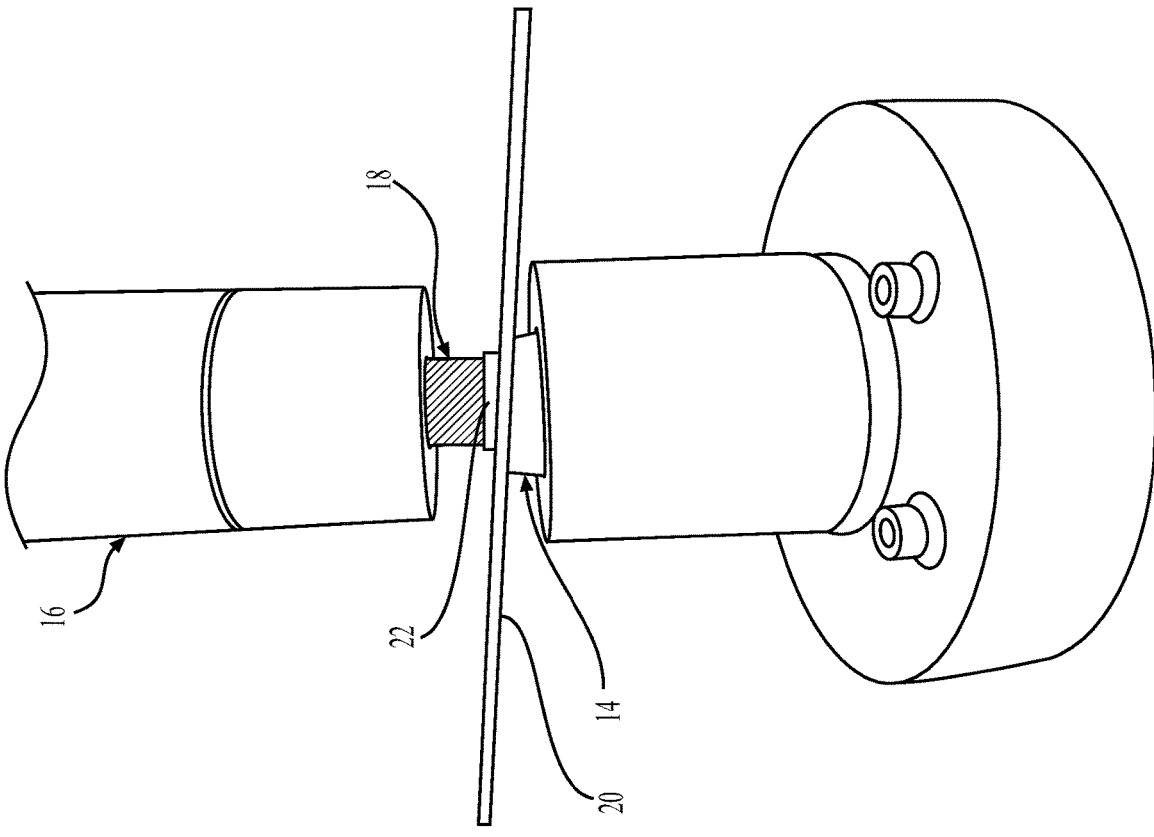
FIG. 15 is a front perspective view of the spot welding assembly, illustrating the base and gun electrodes securing first and second work pieces in pivoted positions.
Figures 41A, 41B, 41C:
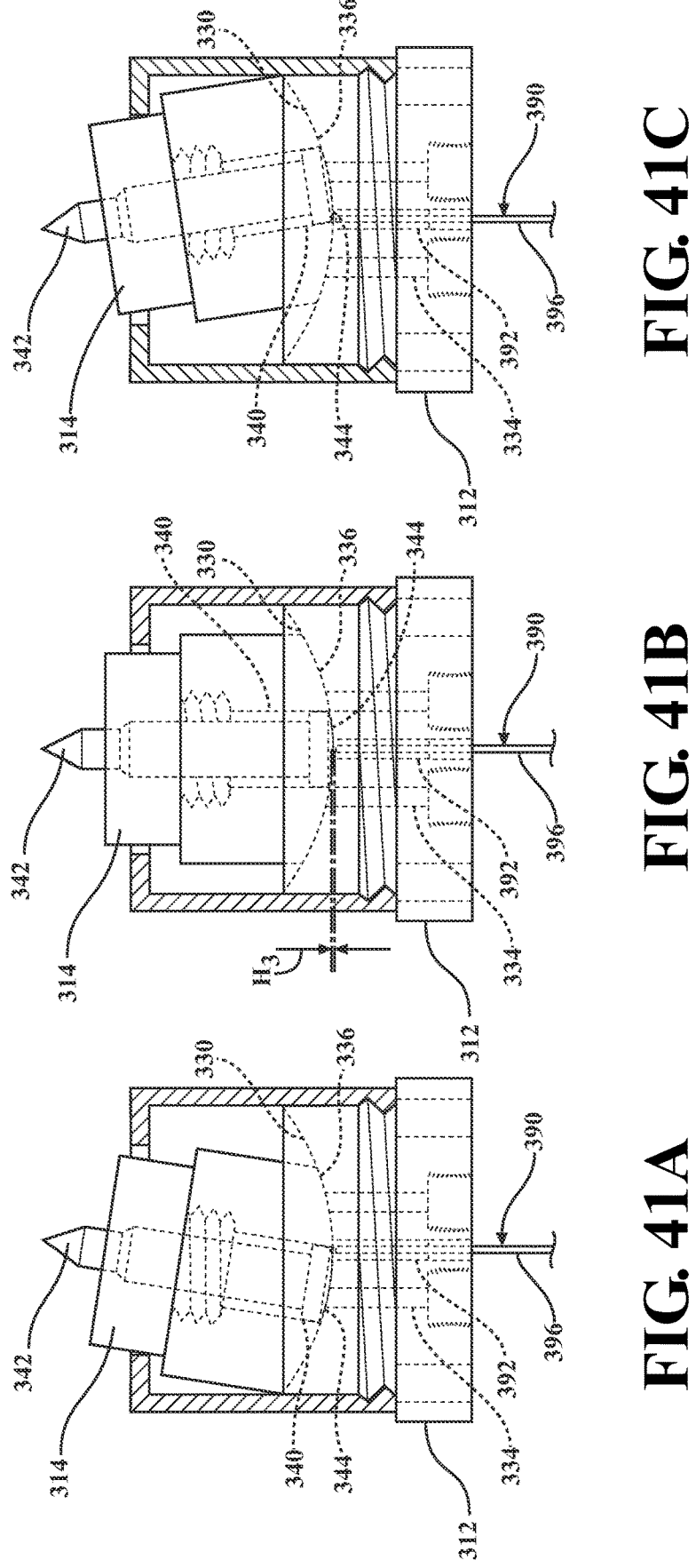
FIGS. 41A, 41B, and 41C are cross-sectional views of the base electrode of FIG. 34 and illustrating the weld pin and base swivel in different orientations but at a third height that is different than the first and second heights.

As illustrated in FIGS. 3A-3D and FIGS. 4A-4C, a weld pin 42 is received by and translatable or slideable along the passage 40 of the base electrode 14 and in its neutral position (such as shown in FIGS. 3B and 41B) extends from a bottom weld pin end 44 disposed in aligned or flush relationship with the second hemispherical portion or surface 36 and past the upper flat surface 39 to a tip 46. According to the example embodiment, the weld pin 42 is made of a non-magnetic stainless steel; however, other non-magnetic materials could be utilized. The weld pin 42 extends axially from the bottom weld pin end 44 to a tip 46 that tapers to a point disposed axially outside of the passage 40. The bottom weld pin end 44 of the weld pin 42 is convex shaped complementary to the convex shape of the second hemispherical portion 36 of the base electrode 12 such that the weld pin 42 also engages and is pivotable along the first hemispherical portion 30 along with the second hemispherical portion 36 of the base electrode 14 during pivoting and rotational movement of the base electrode 14 relative to the base 12. The weld pin 42 is configured to assist in aligning the second work piece 22 relative to the first work piece 20 by being received by the second work piece 22 and a tubular segment 74 of the gun electrode 18 (discussed in further detail below). As illustrated in FIGS. 3B and 3D, the pointed tip 46 of the weld pin 42 assists in guiding the weld pin 42 into the second work piece 22 and tubular segment 74. Alternatively or additionally, the weld pin 42 may be configured to contact the first work piece 20. For example, the weld pin 42 may be located into a channel of the first work piece 20 to assist in locating the first work piece 20.

Figures 17A, 17B, 17C:
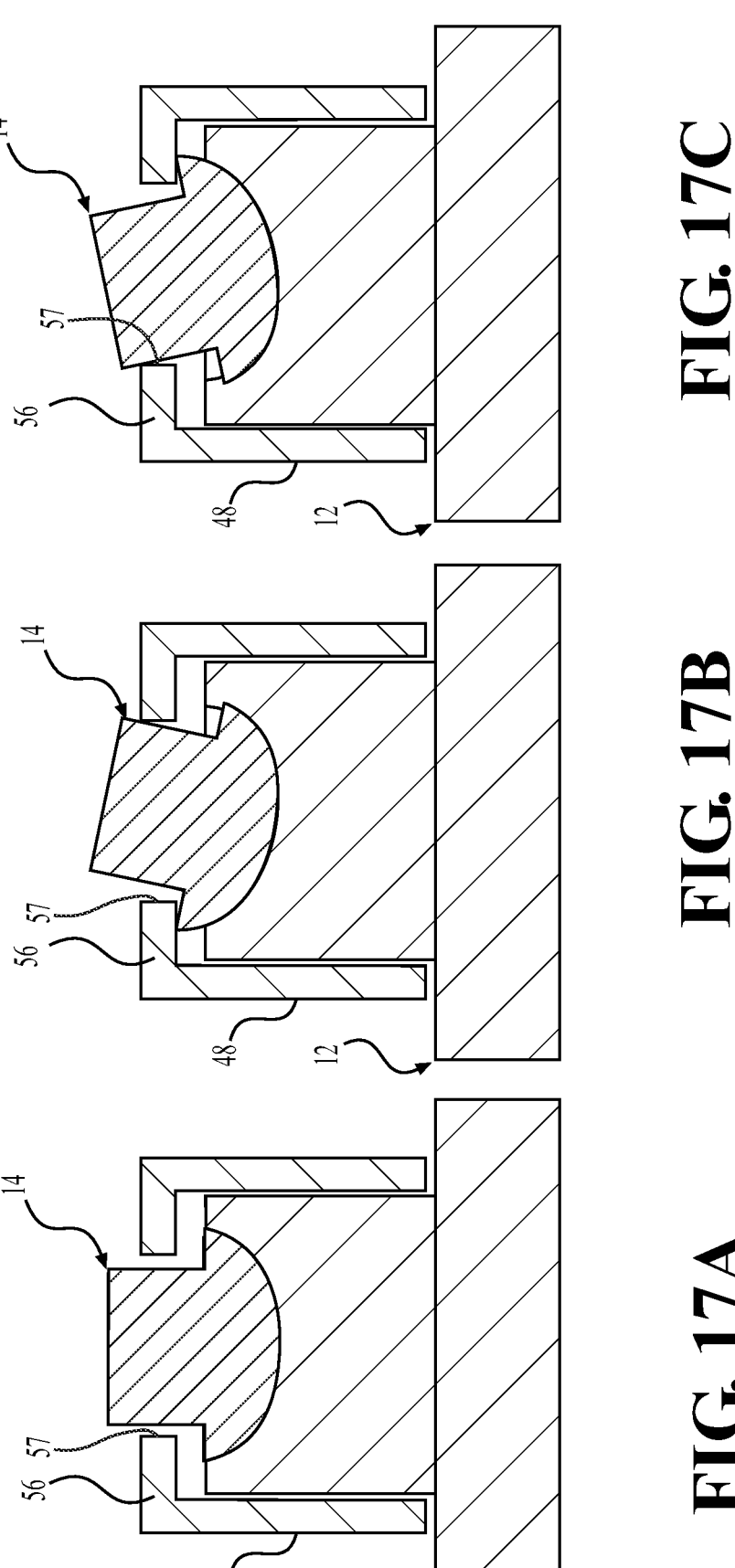
FIGS. 17A-17C are partial front schematic views of the base electrode of the spot welding assembly, illustrating the base electrode being pivoted in various positions.
Figure 18:
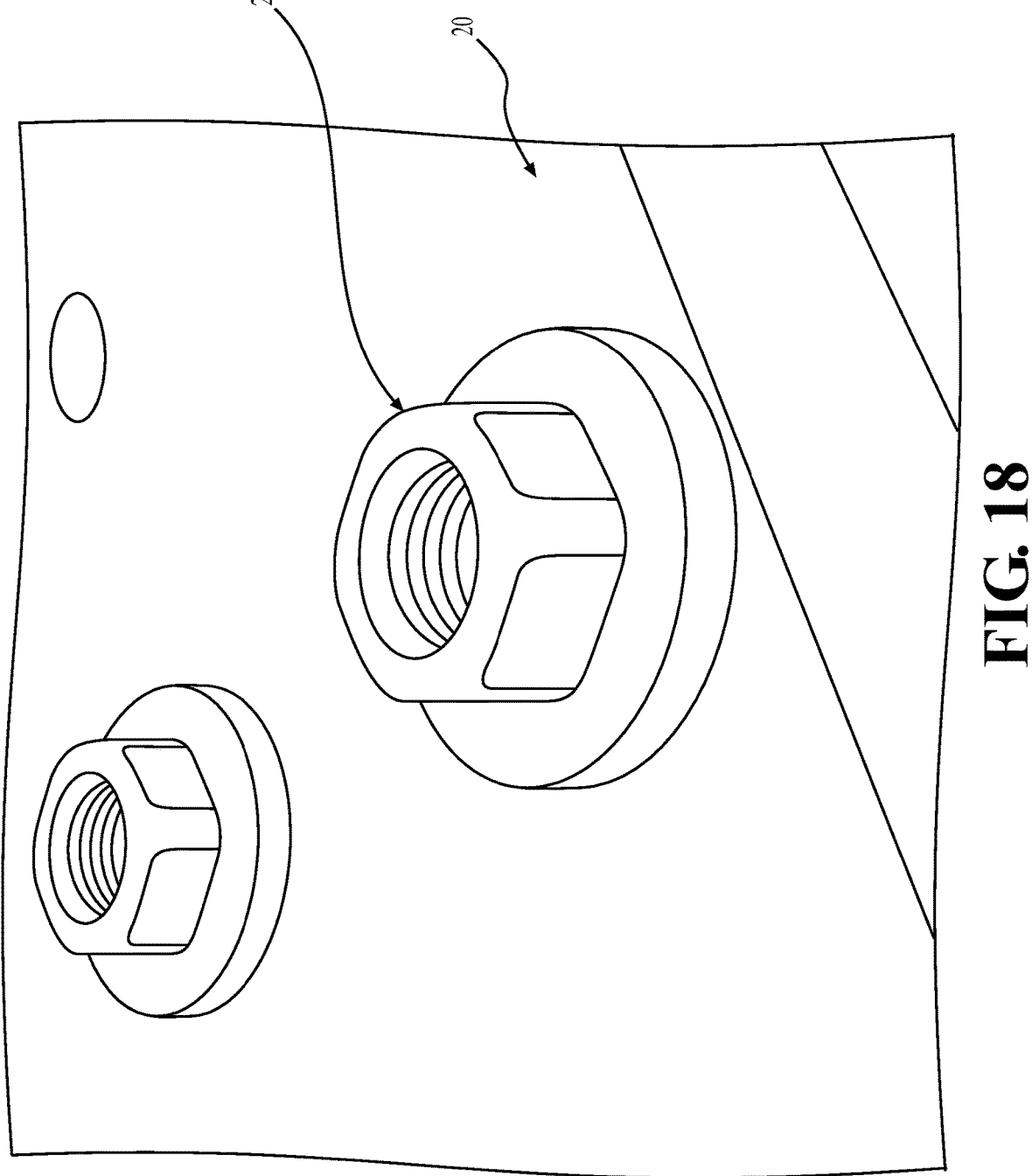
FIG. 18 is a top perspective view of example first and second work pieces for being located and welded by the spot welding assembly.
Figure 21:
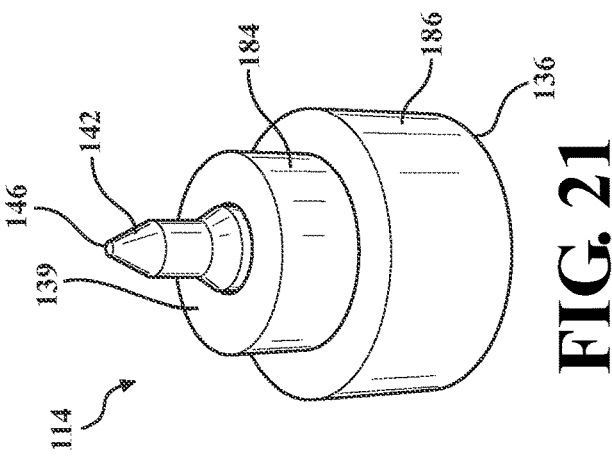
FIG. 21 is a perspective and elevation view of the alternate embodiment of the base electrode.

As best illustrated in FIGS. 3A-3D and FIGS. 10A-10C, a retaining collar 48 that has a generally tubular shape receives the projection portion 26 of the base 12. According to the example embodiment, the retaining collar 48 is made of a non-magnetic stainless steel material; however, other materials could be utilized. The retaining collar 48 extends axially between a bottom collar end 50 and a top collar end 52. A plurality of second threads 54 are defined adjacent to the bottom collar end 50. The second threads 54 are arranged to be threaded with the first threads 32 of the base 12 for securing the retaining collar 48 to the base 12. A first flange 56 being generally cylindrical shaped extends radially inwardly from the top collar end 52 to terminate at a first stop 57 being cylindrically shaped and disposed radially adjacent to and thus in slight radially spaced and encircling relationship with the projection 38 of the base electrode 14. Put another way, the radial spacing of the first flange 56 from the cylindrical projection 38 establishes a cylindrically shaped stop 57 (See e.g., FIGS. 3A-3D and 13A-13C) that limits the pivoting movement of the base electrode 14 relative to the first hemispherical portion 30 of the base 12 in all pivoting directions of the base electrode 14. More particularly, as further shown in FIGS. 17A-17C, as a result of the cylindrical portion 38 abutting the stop 57 of the first flange 56 during the pivoting movement, the pivoting is limited to approximately 15 degrees (defined relative to the axis A) in every direction according to the example embodiment, however, the first flange 56 could be customized and sized to limit the pivoting to other preferred angles. In addition to limiting pivoting movement of the base electrode 14, the retaining collar 48 prevents debris from entering the region of the first and second hemispherical portions 30, 36 in order to provide prolonged use of the welding assembly 10.

As best shown in FIGS. 3A-3D, 7A-7C and 14-15, an upper adapter 58 is coupled with the welding gun 16. According to the example embodiment, the upper adapter 58 is made of a class 2 copper material, however, other highly conductive materials could be utilized. The upper adapter 58 of the welding gun 16 extends axially between a proximal end 60 and a distal end 62, with a plurality of third threads 64 defined adjacent to the proximal end 60 for threadingly fixing the upper adapter 58 to the welding gun 16. The distal end 62 of the upper adapter 58 is concave shaped to define a third hemispherical portion or surface 66 that concaves into the distal end 62. As illustrated in FIGS. 3A-3D, the concave shape of the distal end 62 of the welding gun 16 (as established by the upper adapter 58) is once again defined relative to a cross-sectional plane extending along the axis A. The upper adapter 58 further defines fourth threads 68 adjacent to the distal end 62. A plurality of second wire channels 70 extend generally axially through the upper adapter 58 and terminate at the distal end 62 for receiving wires for transmitting a current to the gun electrode 18. The second wire channels 70 are spaced apart and positioned so that at least one of the second wire channels 70 contacts a convex-shaped fourth hemispherical portion or surface 72 of the gun electrode 18 during any and all positions of the gun electrode 18 throughout its range of pivoting and rotational movement.

As best shown in FIGS. 3A-3D and 6A-6C, the gun electrode 18 is located against the upper adapter 58. According to the example embodiment, the gun electrode 18 is made of a class 2 copper material, however, other highly conductive materials may be utilized. The gun electrode 18 has an upper end being convex shaped to define a convex fourth hemispherical portion or surface 72 that mates and nests with the third hemispherical portion or surface 66 such that the convex fourth hemispherical portion or surface 72 is pivotable and rotatable 360 degrees relative to and along the third hemispherical portion or surface 66. The gun electrode 18 further includes a tubular segment 74 that extends axially from the fourth hemispherical portion 72 and terminates at a flat welding end for receiving and locating the second work piece 22 and the weld pin 42.

Figures 16A, 16B, 16C:
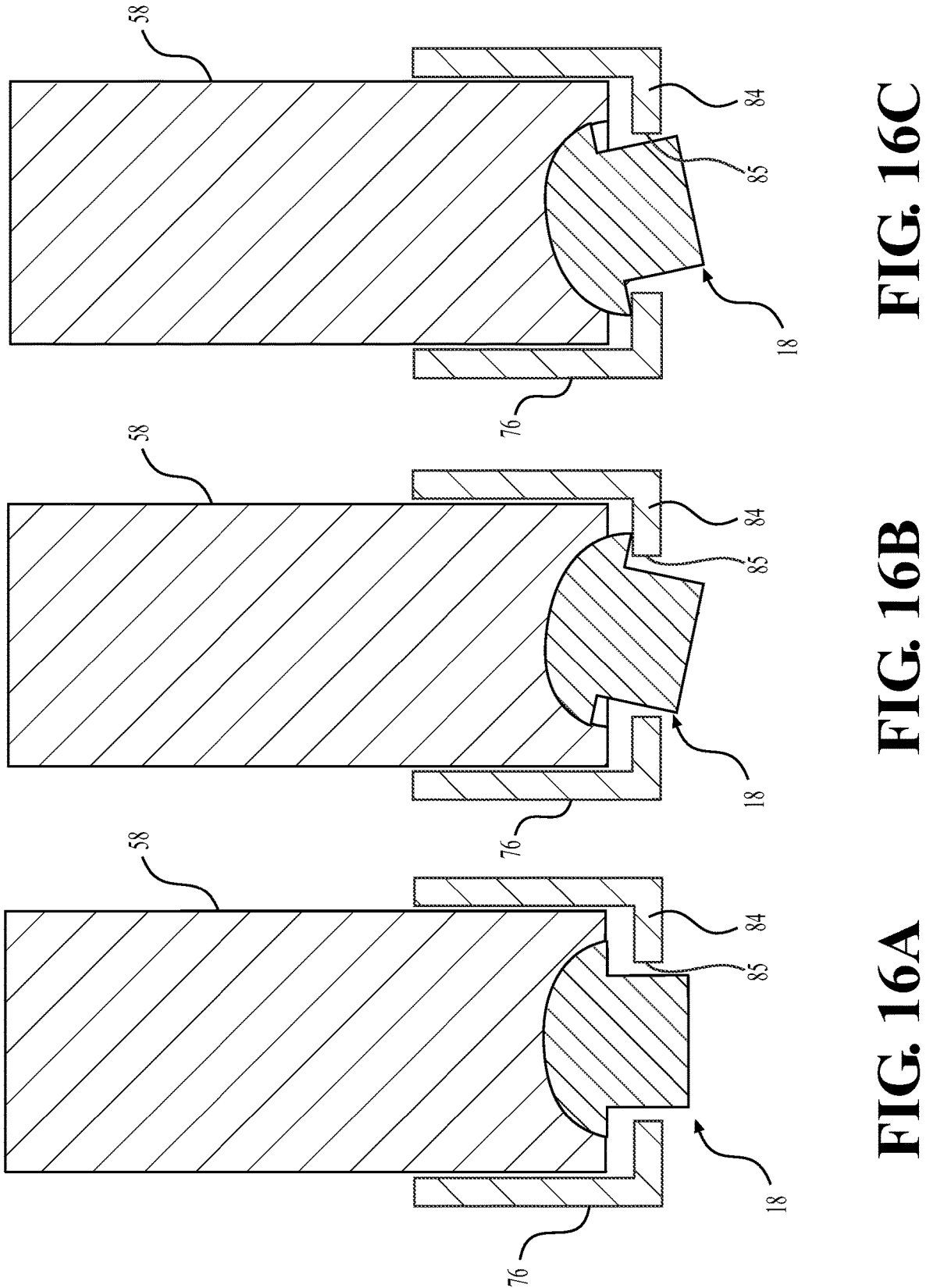
FIGS. 16A-16C are partial front schematic views of the gun electrode of the spot welding assembly, illustrating the gun electrode being pivoted in various positions.

As best shown in FIGS. 3A-3D and 5A-5C, an upper collar 76 that generally has a cylindrical shape is coupled with the upper adapter 58. According to the example embodiment, the upper collar 76 is made of a non-magnetic stainless steel; however, other non-magnetic materials may be utilized. The upper collar 76 extends axially between a fixed end 78 and a guiding end 80. Fifth threads 82 are defined adjacent to the fixed end 78 for being threaded with the fourth threads 68 of the upper adapter 58. The upper collar 76 further includes a second flange 84 that extends radially inwardly from the guiding end 80 and terminates at a second stop 85 being cylindrically shaped and disposed in slight radially spaced and encircling relationship with the tubular element 74 of the gun electrode 18. Put another way, the radial spacing of the second flange 84 from the tubular element 74 establishes a second cylindrically shaped stop 85 (See e.g., FIGS. 3A-3D and 13A-13C) that limits the pivoting movement of the tubular element 74, and thus the related gun electrode 18, relative to the third hemispherical portion 66 of the welding gun 16 (as established by the distal end 62 of the upper adapter 58) in all pivoting directions of the gun electrode 18. More particularly, as further shown in FIGS. 16A-16C, as a result of the tubular element 74 abutting the second stop 85 of the second flange 84 during the pivoting movement, the pivoting is limited to approximately 15 degrees (defined relative to the axis A) in every direction according to the example embodiment, however, the second flange 84 could be customized and sized to limit the pivoting to other preferred angles. In addition to limiting pivoting movement of the gun electrode 18, the upper collar 76 prevents debris from entering the region of the third and fourth hemispherical portions 66, 72 in order to provide prolonged use of the welding assembly 10.

Figures 2A, 2B, 2C:
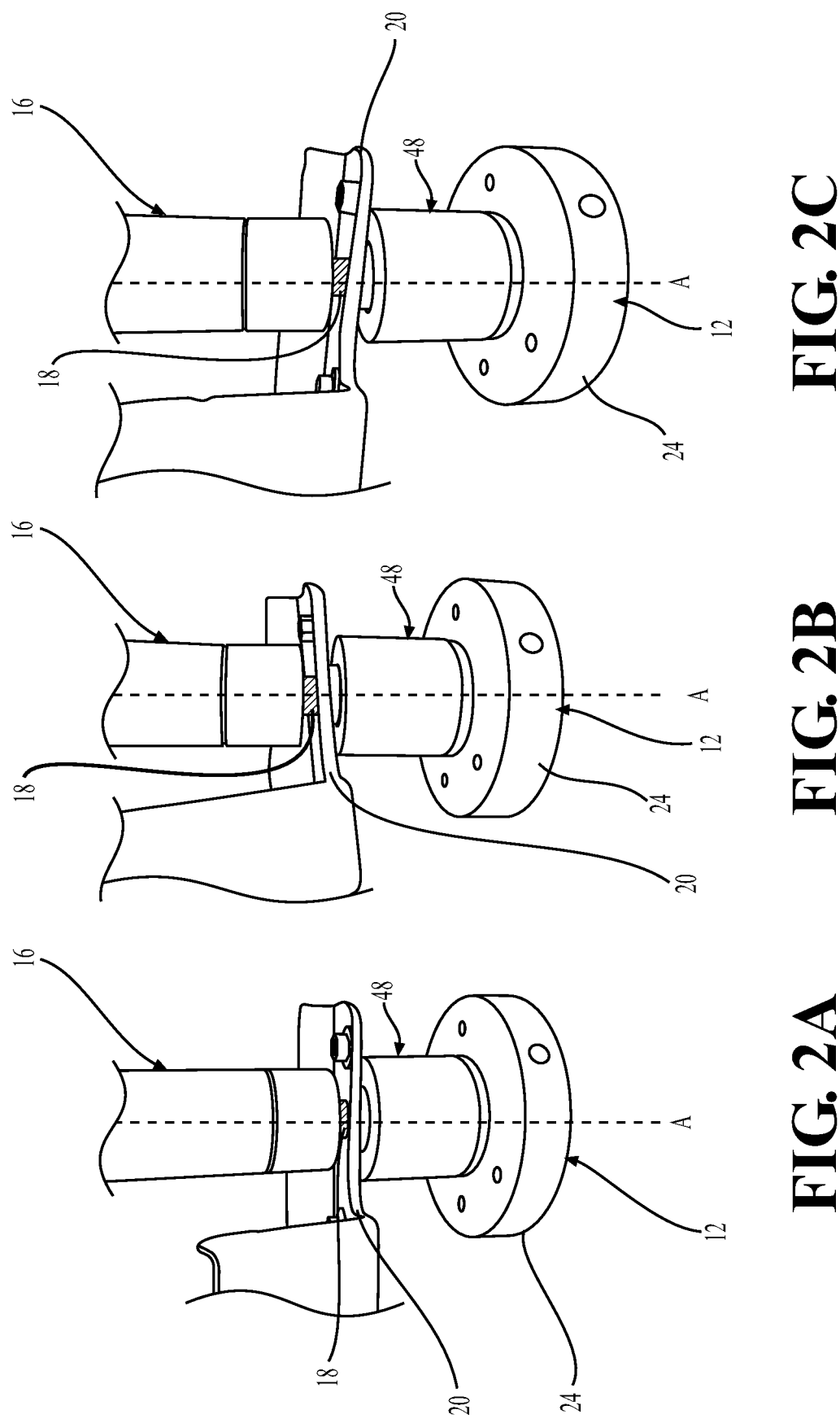
FIGS. 2A-2B are front perspective views of work pieces located between base and gun electrodes of the spot welding assembly, illustrating the base and gun electrodes being pivoted in different directions.

During use of the spot welding assembly 10, the pivoting movement and rotation of the base and gun electrodes 14, 18 allows the base and gun electrodes 14, 18 to be oriented flat against the first and second work pieces 20, 22 to provide a large contact area against the first and second work pieces 20, 22, even when the first and second work pieces 20, 22 do not lie parallel to an original plane that is defined between the base and gun electrodes 14, 18 when they are in an un-pivoted/centered position, such as when they are improperly placed or irregularly shaped. The large contact area provides adequate electrical and thermal conductivity during welding, thus ensuring a successful weld even in non-ideal conditions. For example, FIG. 2A shows the base and gun electrodes 14, 18 in a centered position with the first work piece 20 positioned generally along the original plane, FIG. 2B shows the base and gun electrodes 14, 18 in a tilted left position while maintaining flat contact against the first and second work pieces 20, 22, and FIG. 2C shows the base and gun electrodes 14, 18 in a tilted right position while maintaining flat contact against the first and second work pieces 20, 22.

As illustrated in FIG. 1, during operation, the welding gun 16 starts in a raised position, and the base and gun electrodes 14, 18 are in their centered, un-pivoted state. The first work piece 20 (a plate in the example embodiment) is positioned on the base electrode 14 via either automatic or manual load. At this point, the base electrode 14 may be rotated and pivoted to compensate for any angular deflection caused by the first work piece 20 not being located along the original plane to ensure proper contact of the base electrode 14 against the first work piece 20. Specifically, the base electrode 14 may be rotated and pivoted to match an angle of the first work piece 20. Once the first work piece 20 is located, the second work piece 22 (which is a projection fastener in the case of the example embodiment), is placed over the weld pin 42. The gun electrode 18 is then lowered toward the base electrode 14 with the welding gun 16. Upon contact of the second work piece 22 against the first work piece 20, the gun electrode 18 automatically rotates and pivots to match an angle of the base electrode 14 to provide full contact between the first and second work pieces 20, 22. An electrical current is then supplied to the base and gun electrodes 14, 18, melting the second work piece 22 to the first work piece 20, to create a weld therebetween. It should be appreciated that one of the first and second work pieces 20, 22 may present one or more projections that engage the other work piece for concentrating the current and weld.

Figure 20:
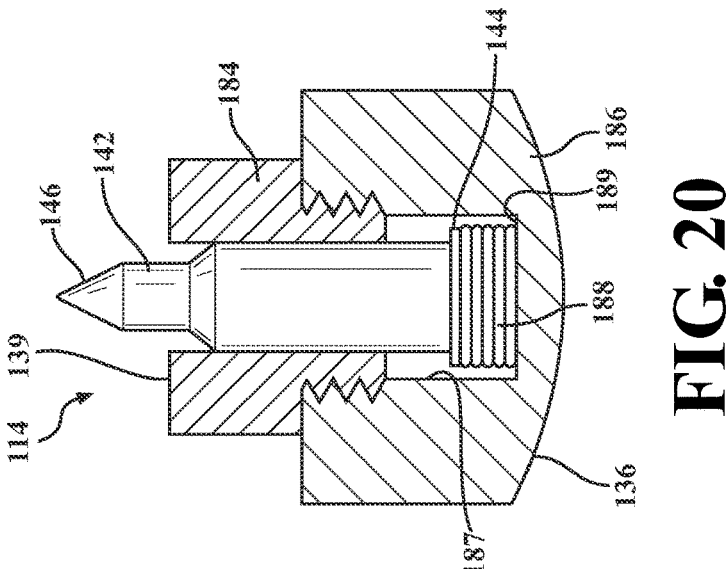
FIG. 20 is another cross-sectional view of the alternate embodiment of the base electrode and showing the compression spring in a compressed condition.
Figure 19:
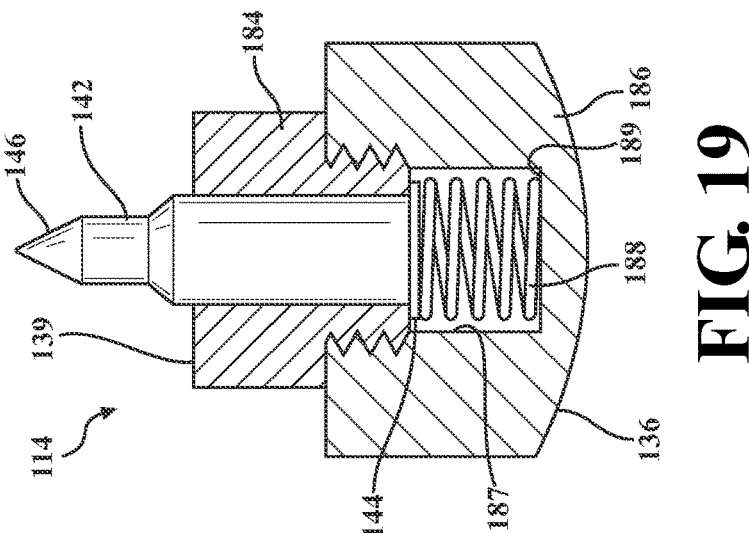
FIG. 19 is a cross-sectional view of an alternate embodiment of a base electrode and showing a compression spring contained therein in an expanded condition.

Referring now to FIGS. 19-22, an alternate embodiment of the base electrode 114 is generally shown with like numerals, separated by an initial prefix of "1" in the drawings and descriptions below, identifying similar components with the embodiment described above and thus in certain instances not described again herein but incorporated by reference through the use of the "1" prefix here or in the drawings. One feature that distinguishes the base electrode 114 from the embodiment described above is the base electrode 114 is a self-contained assembly which includes multiple pieces, namely a base cap 184 and a base swivel 186 that are separate components and removably connectable to one another to establish the base electrode 114. The base cap 184 includes the upper welding surface 139 that, in operation, directly contacts the first work piece 20. As best illustrated in FIGS. 19-20, in a preferred arrangement, the base cap 184 is in threaded engagement with the base swivel 186 to establish the removably interconnected relationship, such that the base cap 184 can be easily removed from the base swivel 186, when worn, and replacement in required. Thus, when the base cap 184 reaches the end of its operating life, the entire base electrode 114 does not have to be discarded and replaced. The base swivel 186 includes the convex second hemispherical portion of surface 136 that is in the frictionless contact with the first hemispherical portion 130 of the base 120 due to the jet of air injected between these components. The base cap 184 and the base swivel 186 are preferably made of the same material, e.g., copper.

Further, in contradistinction to the first embodiment of the base electrode 14, a passage 40 does not extend entirely through the base electrode 14. Instead, in this second embodiment of the base electrode 140, the base swivel 186 includes an inner bore 187 which (when the base cap 184 is interconnected to the base swivel 186) extends from the upper welding surface 139 to a closed bore bottom 189 disposed in spaced relationship with the lower, convex second hemispherical portion or surface 136 of the base electrode 114, i.e., the inner bore 187 is not a through hole like the passage 40 in the first embodiment of the base electrode 12. An upper portion of this inner bore includes female threads to threadedly engage with male threads on the base cap 184. A lower portion of the inner bore 187 is unthreaded and receives a compression spring 188. FIG. 19 shows the compression spring 188 in an uncompressed condition, and FIG. 20 shows the compression spring 188 in a compressed condition, such as during operation of the welding assembly. The weld pin 142 is disposed in the inner bore and extends from the bottom weld pin end 144 which abuts and is supported by the compression spring 188, and which biases the weld pin 142 in an upward direction, to the weld tip 146 disposed outside of the inner bore 187 and the base cap 184 when the components are interconnected together. Since the inner bore 187 does not extend all the way through the base swivel 186, the semi-hemispherical surface 136 of the base swivel 186 extends uninterruptedly within the confines established by its outer perimeter. This configuration also allows the bottom weld pin end 144 of the weld pin 142, which is where the weld pin 142 contacts the compression spring 188, to be flat or planar rather than radiused or convex shaped, as is the case in the above-discussed embodiment.

In some other embodiments, the base cap 184 and the base swivel 186 may be joined to one another through attachment means other than threads that are detachable to allow the base cap 184 to be replaced when worn.

Referring now to FIGS. 23-24 and 27-28, an alternate embodiment of the gun electrode 118 is also provided. In this embodiment, the gun electrode 118 is also made as two pieces that are removably coupled with one another to form the gun electrode 118. More specifically, the first piece of the gun electrode 118 is a gun cap 190 that includes the flat welding surface or end which, in operation, directly contacts the second work piece 22. The second piece of the gun electrode 118 is a gun swivel 192, which includes the convex fourth semi-hemispherical portion or surface 172 that allows the gun electrode 118 to articulate and swivel about the third hemispherical portion 66 of the welding gun 16. Similar to the base electrode 114 described immediately above, the gun cap 190 and gun swivel 192 are preferably threaded with one another to establish the removable interconnection. However, other means of establishing the removable interconnection can be utilized without departing from the scope of the subject disclosure. This two-piece configuration of the gun electrode 18 allows for reduced waste because the gun cap 190 can be replaced after wear without discarding and replacing the entire gun electrode 118.

Figures 22, 23, 24, 25, 26:
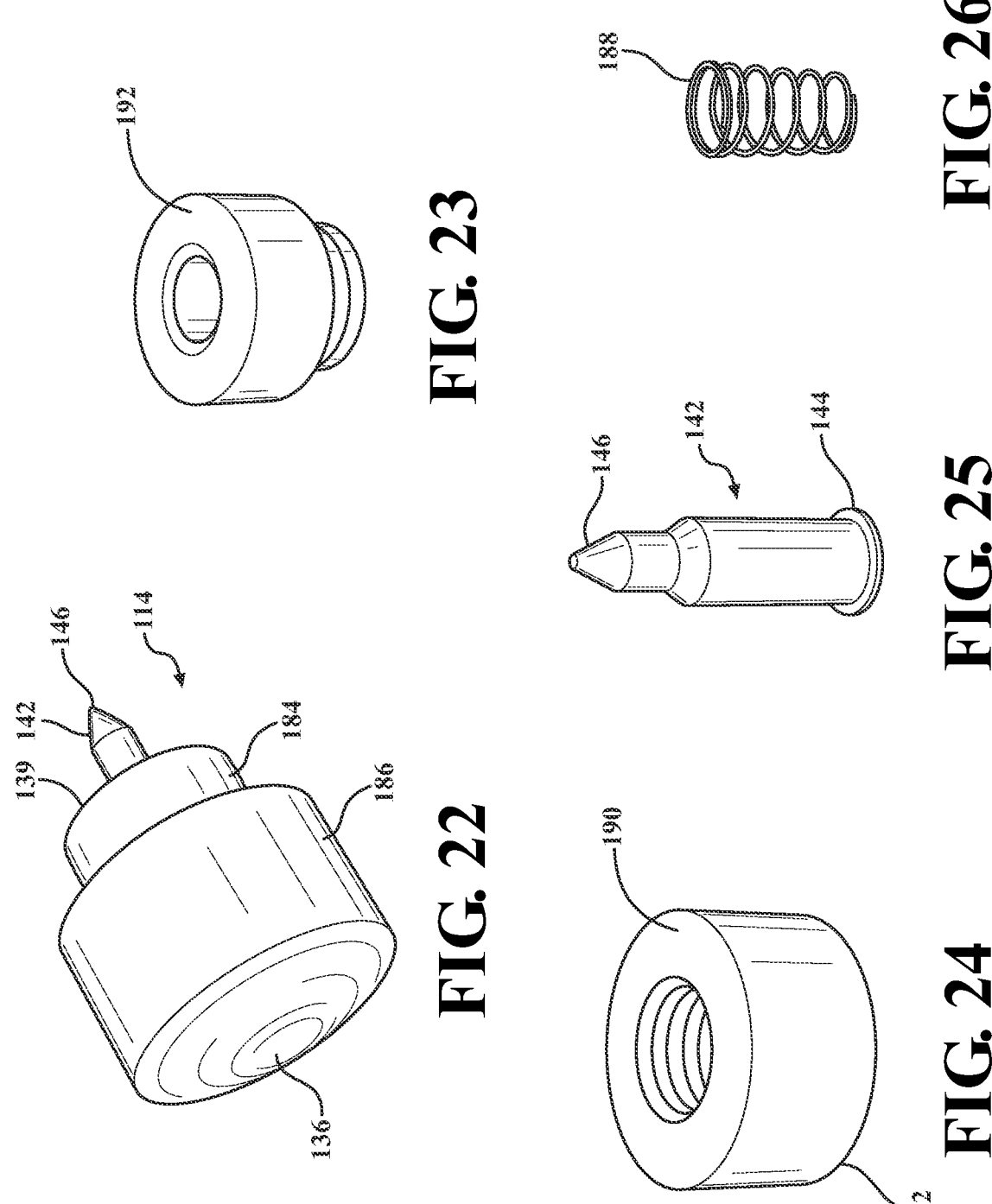
FIG. 22 is a perspective and elevation view of the alternate embodiment of the base electrode taken from a different perspective than FIG. 21.
FIG. 23 is a perspective and elevation view of a gun cap for an alternate embodiment of the gun electrode.
FIG. 24 is a perspective and elevation view of a gun swivel for the alternate embodiment of the gun electrode.
FIG. 25 is a perspective and elevation view of a weld tip of the alternate embodiment of the base electrode.
FIG. 26 is a perspective and elevation view of a compression spring for the alternate embodiment of the base electrode.
Figure 28:
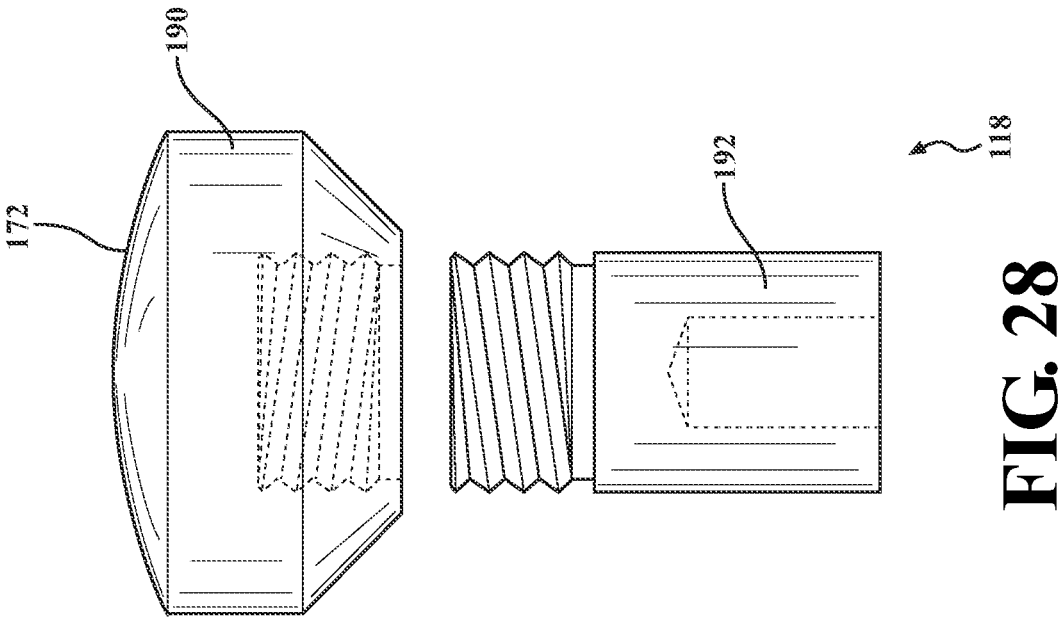
FIG. 28 is a cross-sectional and exploded view of the alternate embodiment of the gun electrode.
Figure 27:
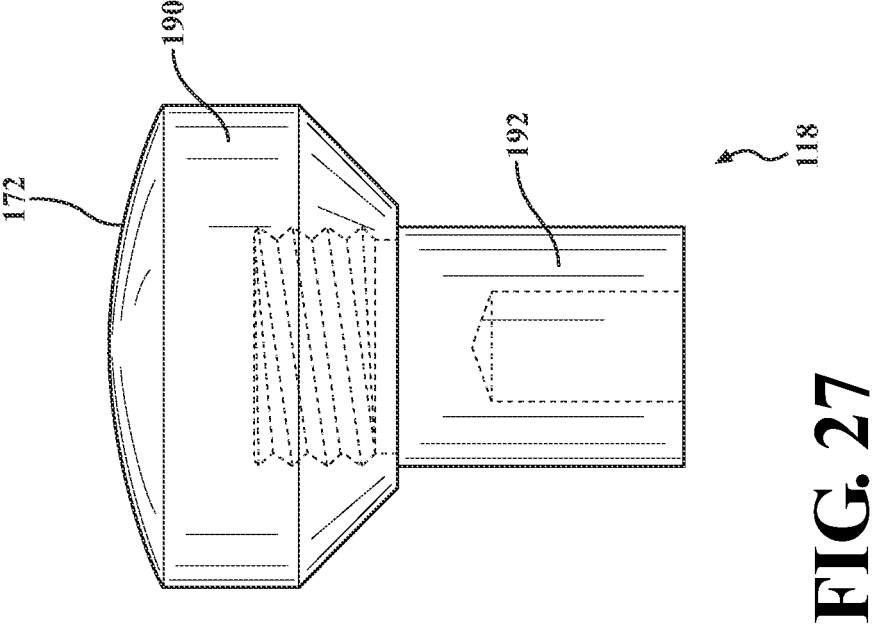
FIG. 27 is a cross-sectional view of the alternate embodiment of the gun electrode.
Figures 29, 30:
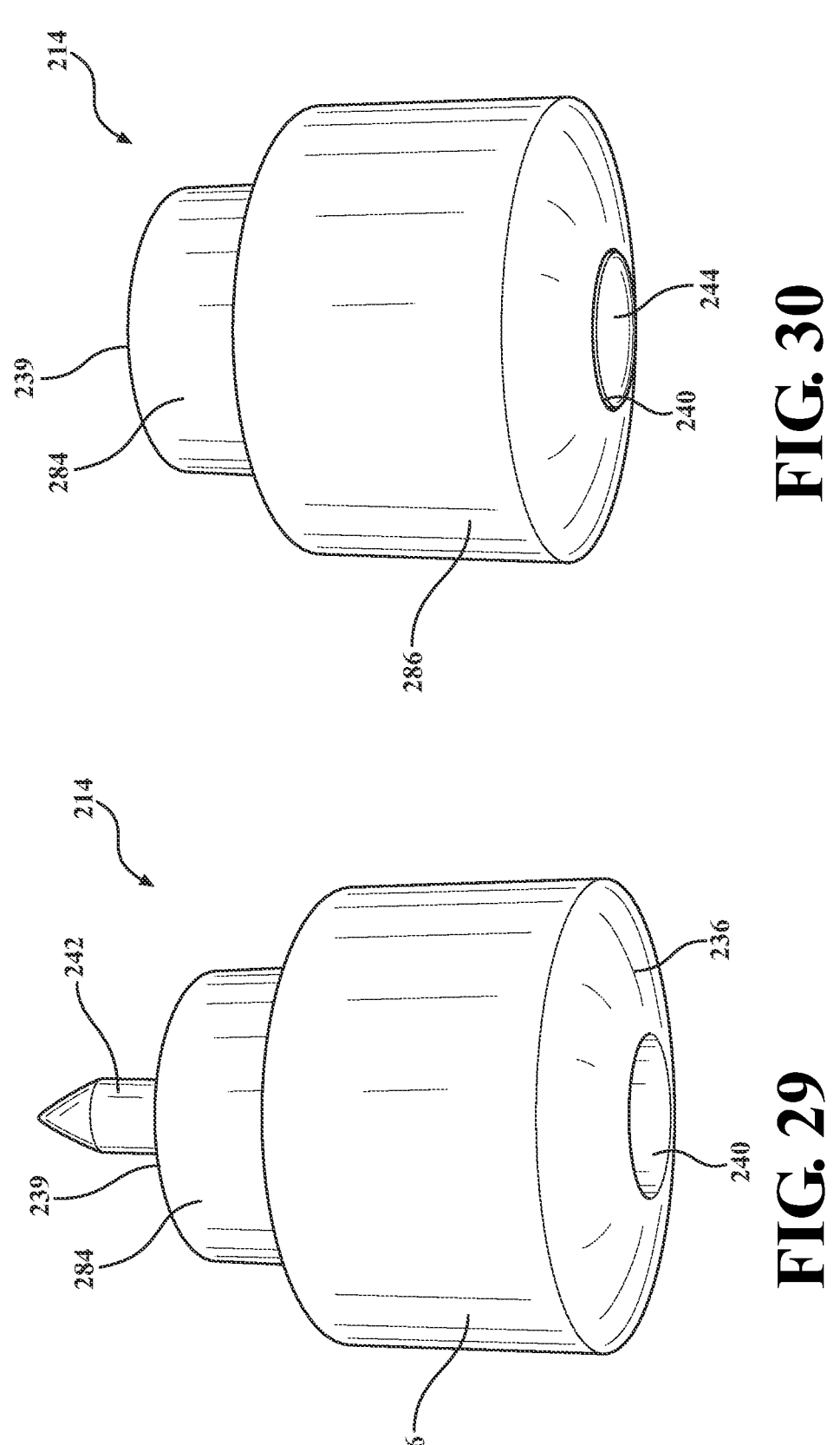
FIG. 29 is a perspective view of an alternate embodiment of the base electrode and showing the weld pin in an extended position.
FIG. 30 is another perspective view of the alternate embodiment of the base electrode and showing the weld pin in a retracted position.

Still further, in this alternate embodiment, the weld pin 142, which is shown in FIG. 25, is made of a high carbon steel material, such as D2, that is coated to reduce arcing during a welding operation. The coating may be, for example, a black oxide or a diamond-like carbon (DLC) material.

Referring now to FIGS. 29-33, yet another embodiment of the base electrode 214 is generally shown with like numerals, separated by an initial prefix of "2" throughout the drawings and specification, identifying similar components with the embodiments described above and thus in certain instances not described again herein but incorporated by reference herein through use of the "2" prefix either in the following description or in the drawings. Similar to the embodiment of FIGS. 19 and 20, in this embodiment, the base electrode 214 is made as two pieces, namely a base cap 284 and a base swivel 286, which are threadedly joined together. However, in this embodiment, the passage 240 of the base swivel 286 extends fully through the base swivel 286, i.e., the passage 240 has the form of a through hole extending through the entire base electrode 214 similar to the first embodiment of the base electrode 14. Thus, unlike the embodiment of FIGS. 19 and 20, the weld pin 242 is biased by air pressure that is delivered through one or more openings in the base 212 rather than a compression spring.

As best illustrated in FIGS. 31-35, a sensing device 290, 390 is disposed below the base electrode 214, 314 for sensing a position of the weld pin 242, 342 within the passage 240, 340 of the base electrode 214, 314. More specifically, the base 212, 312 can define an instrument channel 292, 392 extending along the axis A and in aligned relationship and communication with the weld pin 242, 342 and the passage 240, 340 when the base electrode 214, 314 is disposed in a central, non-pivoted position (See e.g., FIGS. 32, 39B, 40B and 41B). Even when the base electrode is disposed in a pivoted position, the instrument channel 292, 392 remains in communication with the passage 240, 340 and thus the weld pin 242, 342 disposed therein (See e.g., FIGS. 39A, 39C, 40A, 40C, 40A, 40C). The sensing device 290, 390 is disposed in communication with the instrument channel 292, 392 and the weld pin 242, 342 for sensing a position of the weld pin within the passage 240, 340 of the base electrode 314. Although the sensing device 290, 390 is described here in association with the alternative two-piece arrangement of the base electrode 214, 314, the sensing device 290, 390 could also be used in association with the first embodiment of the base electrode 14 without departing from the scope of the subject disclosure. Put another way, as will be appreciated in view of the following disclosure, the sensing device 290, 390 does not rely on or require implementation of the two-piece base electrode 214, 314 described herein and can also be used in association with the first embodiment of the spot welding assembly 10 and related base electrode 14.

Figures 31, 32, 33:
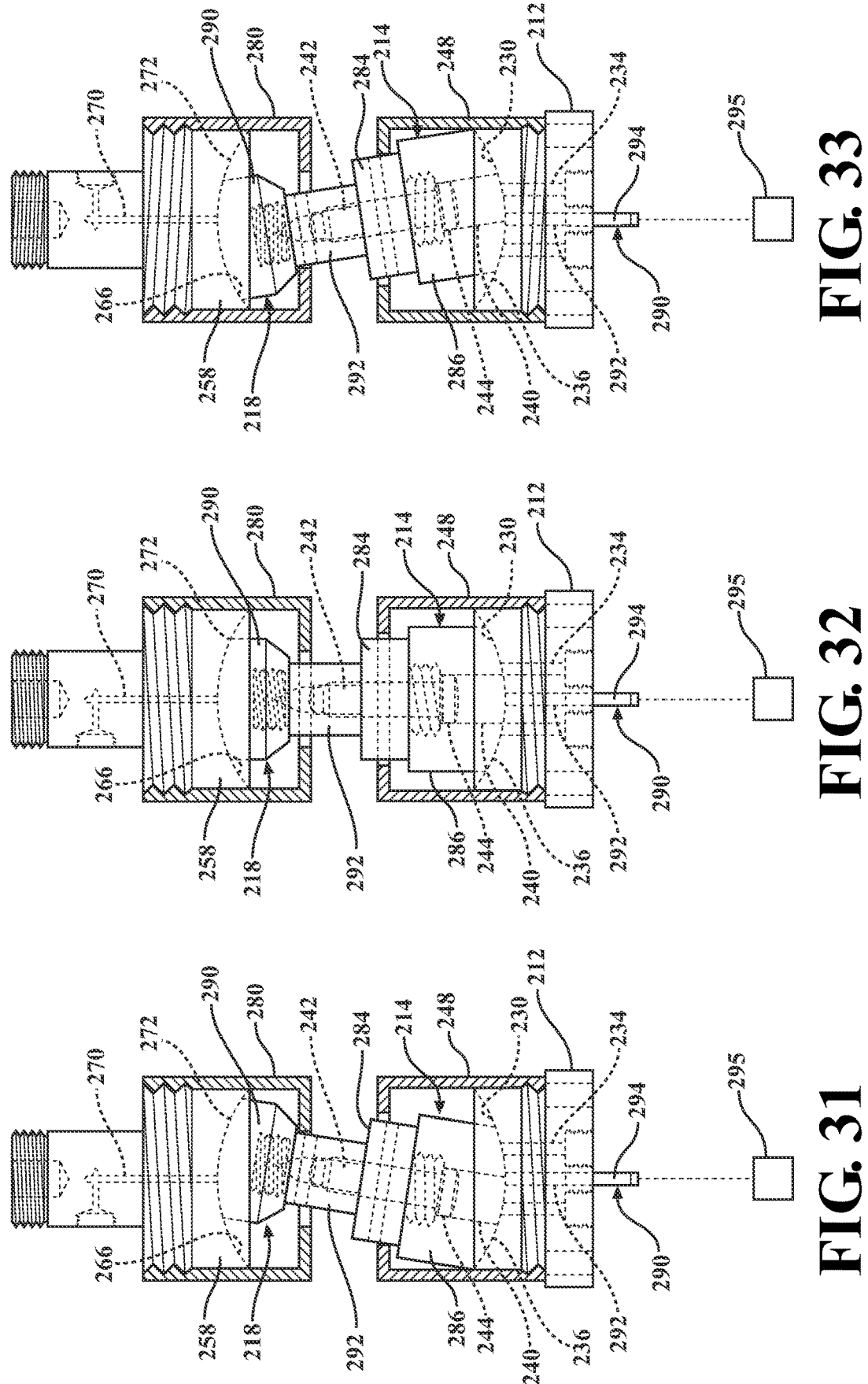
FIG. 31 is a cross-sectional view illustrating a spot welding assembly including the base electrode of FIGS. 29 and 30 in a first operating position and illustrating a sensing device, in this arrangement comprised of fiber optic sensor, disposed below the base electrode for sensing a position of the weld pin.
FIG. 32 is a cross-sectional view illustrating the spot welding assembly and fiber optic sensor of FIG. 31 in a second operating position.
FIG. 33 is a cross-sectional view illustrating the spot welding assembly and fiber optic sensor of FIG. 31 in a third operating position.

In accordance with a first arrangement, and as illustrated in FIGS. 31-33, the sensing device 290, 390 is comprised of a fiber optic sensor 294 positioned in communication with the instrument channel 292 of the base 212 and configured to emit a light beam upwardly and serially through the instrument channel 292 and the passage 240 and into contact with the bulging or bottom weld pin end 244 of the weld pin 242 to sense a reflection of that beam of light. By sensing the reflection of the beam of light, a controller 295 disposed in communication with the fiber optic sensor 294 is configured to determine the distance between the fiber optic sensor 294 and the weld pin 242 based on the reflected or returned light beam and thus determine the position of the weld pin 242 within the passage 240 of the base swivel 286. In an exemplary embodiment, the bottom weld pin end 44 of the weld pin 242 is highlighted, such as being painted white, to improve the fiber optic sensor's 292 ability to measure the distance to the weld pin 242.

The bottom weld pin end 244 (e.g., bulging end) of the weld pin 242 is semi-spherically curved (i.e., convex shaped) with the same radius of curvature as the convex second hemispherical portion 236 of the base swivel 286 such that when the weld pin 242 is in a fully retracted position (See e.g., FIG. 30), the bulging end 244 of the weld pin 242 is flush with the second hemispherical portion 236 of the base swivel 286. Thus, as the base electrode 214 articulates during operation (See e.g., FIGS. 31 and 33), the distance measured by the fiber optic sensor 294 is not affected.

Referring now to FIGS. 36A-38B yet another exemplary embodiment of the base electrode 314 is generally shown with like numerals, separated by a prefix of "3" throughout the drawings and specification identifying similar components with the embodiments described above and thus in certain instances not described again herein but incorporated herein by reference through use of the "3" prefix either in the following description or in the drawings. This embodiment is similar to the embodiment shown in FIGS. 29-33 in that the bulging or bottom weld pin end 344 of the weld pin 342 is semi-spherically curved (i.e., convex shaped) such that when the weld pin 342 is in the fully retracted position (see FIGS. 37B and 41A-C), it is flush with the second hemi-spherical portion 336 of the base swivel 386.

Figure 35:
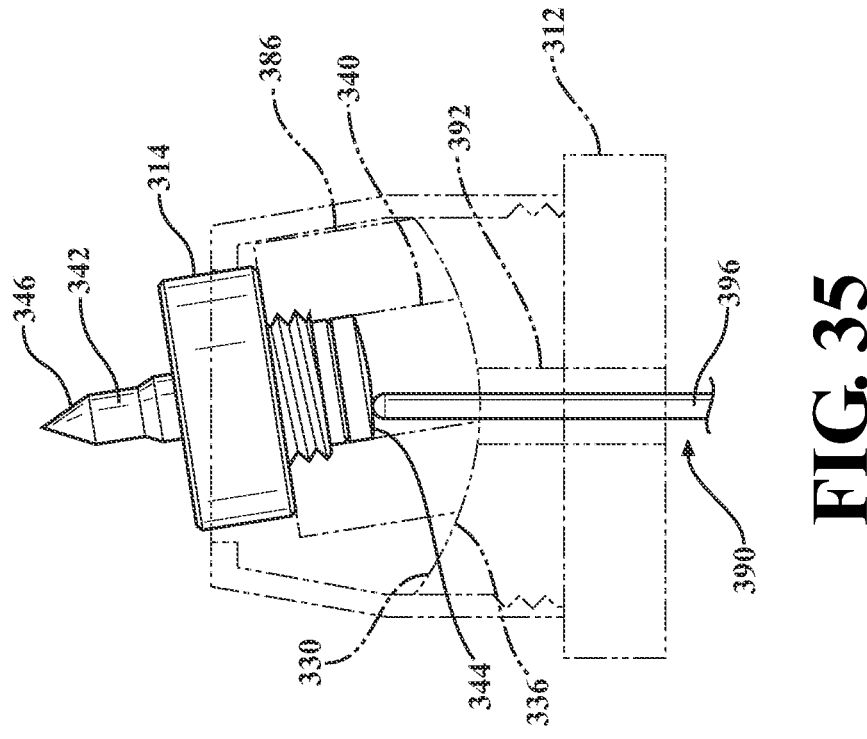
FIG. 35 is another cross-sectional view of the base electrode of FIG. 34 and illustrating the touch probe disposed in abutting relationship with the weld pin in a different, second orientation of the base swivel.
Figure 34:
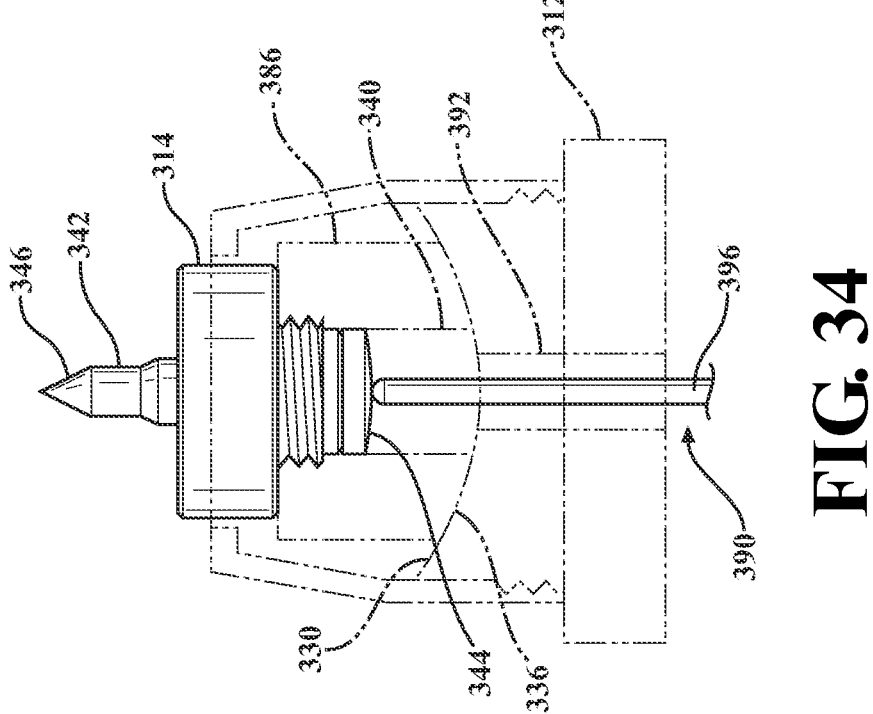
FIG. 34 is a cross-sectional view of another alternate embodiment of the base electrode and illustrating the weld pin and base swivel in a first orientation and the sensing device comprised of a touch probe disposed in abutting relationship with the weld pin in the first orientation for sensing a position of the weld pin.
Figure 37A:
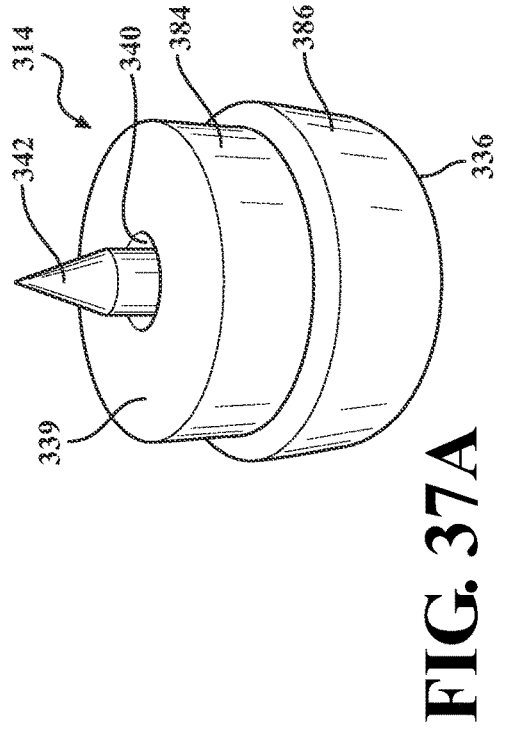
FIGS. 37A and 37B are perspective views taken from different perspectives and illustrating the weld pin in retracted positions.
Figure 37B:
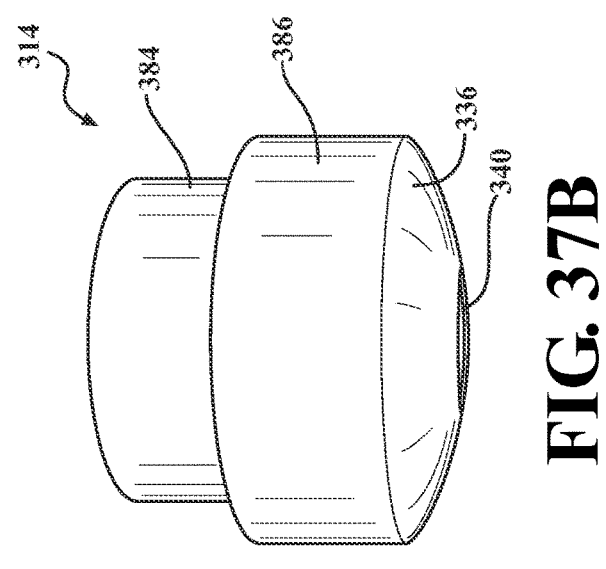
Figure 36A:
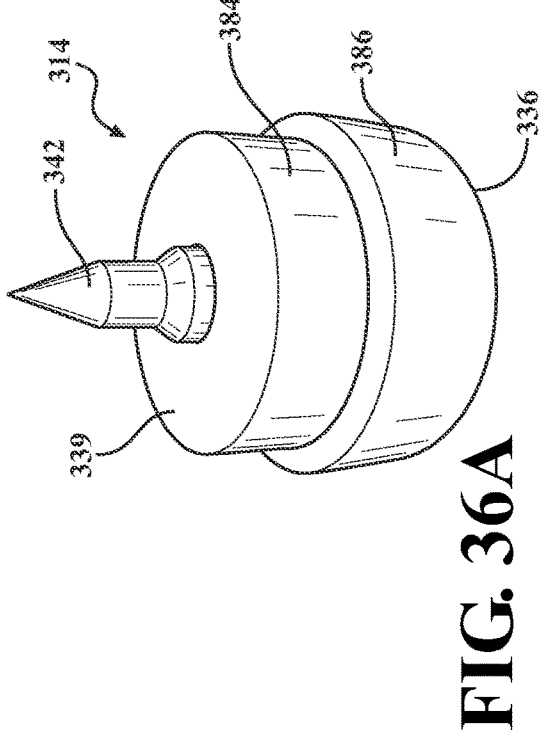
FIGS. 36A and 36B are perspective views taken from different perspectives and illustrating a weld pin of the base electrode of FIG. 34 in an extended position.
Figure 36B:
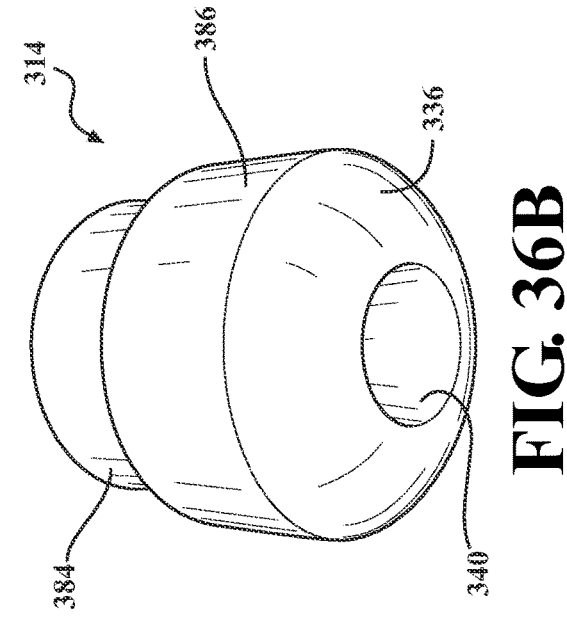
Figure 38A:
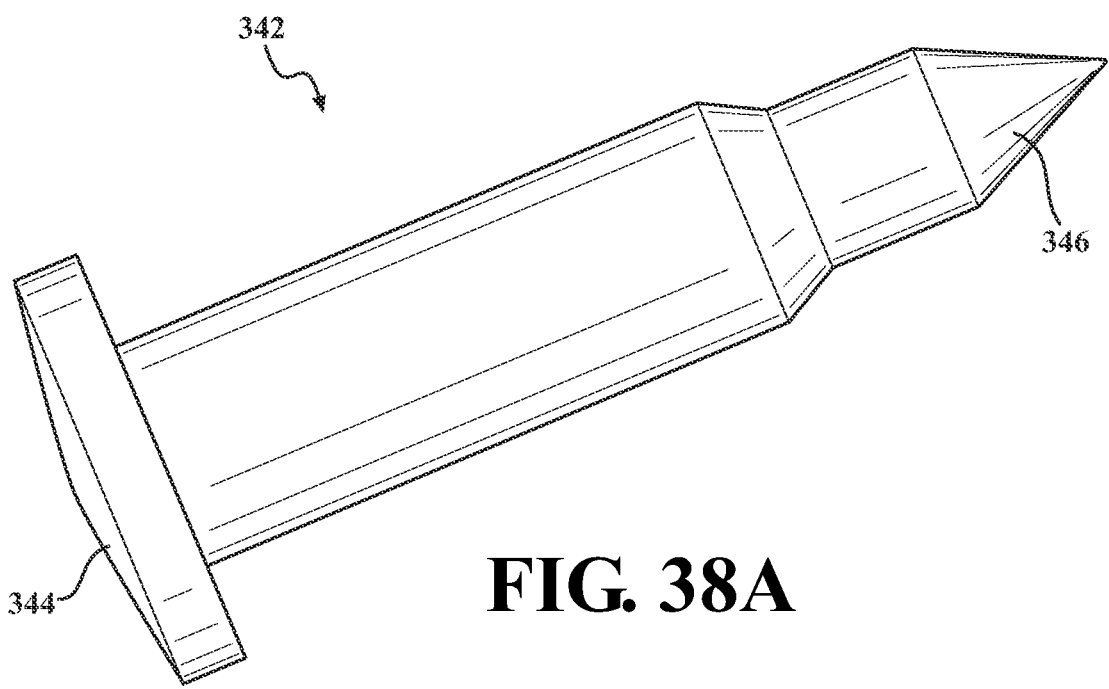
FIGS. 38A and 38B are perspective views illustrating the weld pin of the base electrode of FIG. 34 from different perspectives.
Figure 38B:
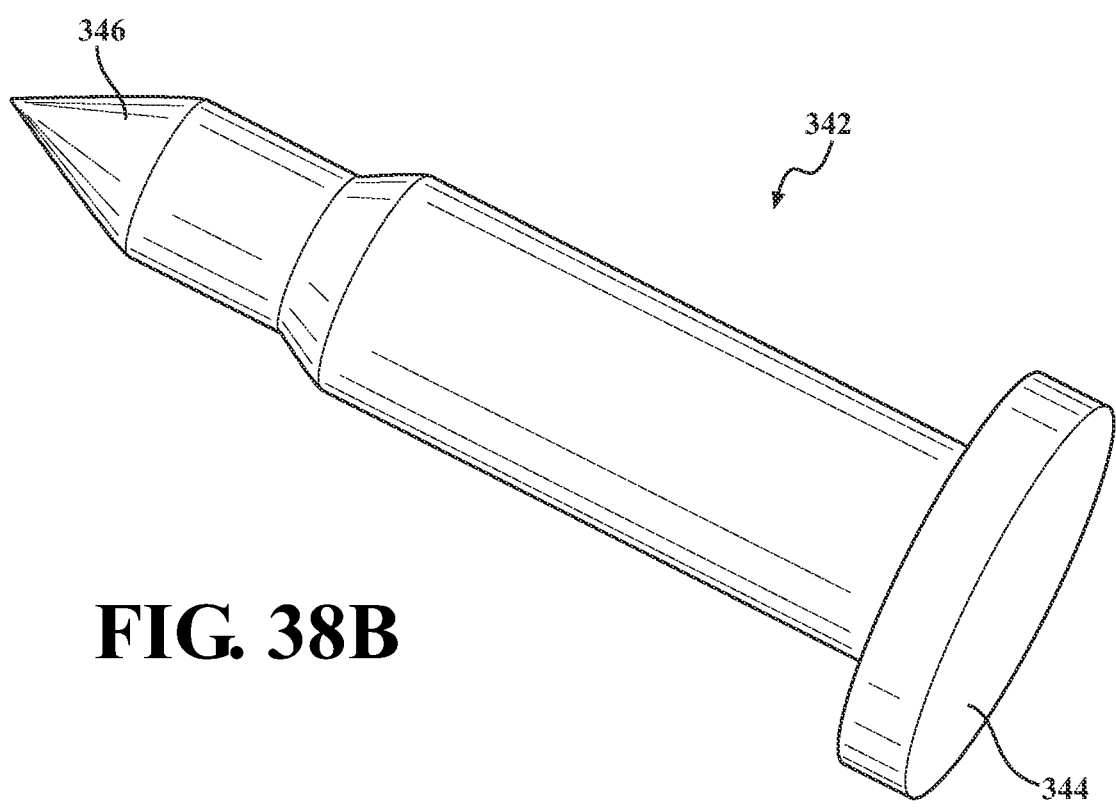
Figures 39A, 39B, 39C:
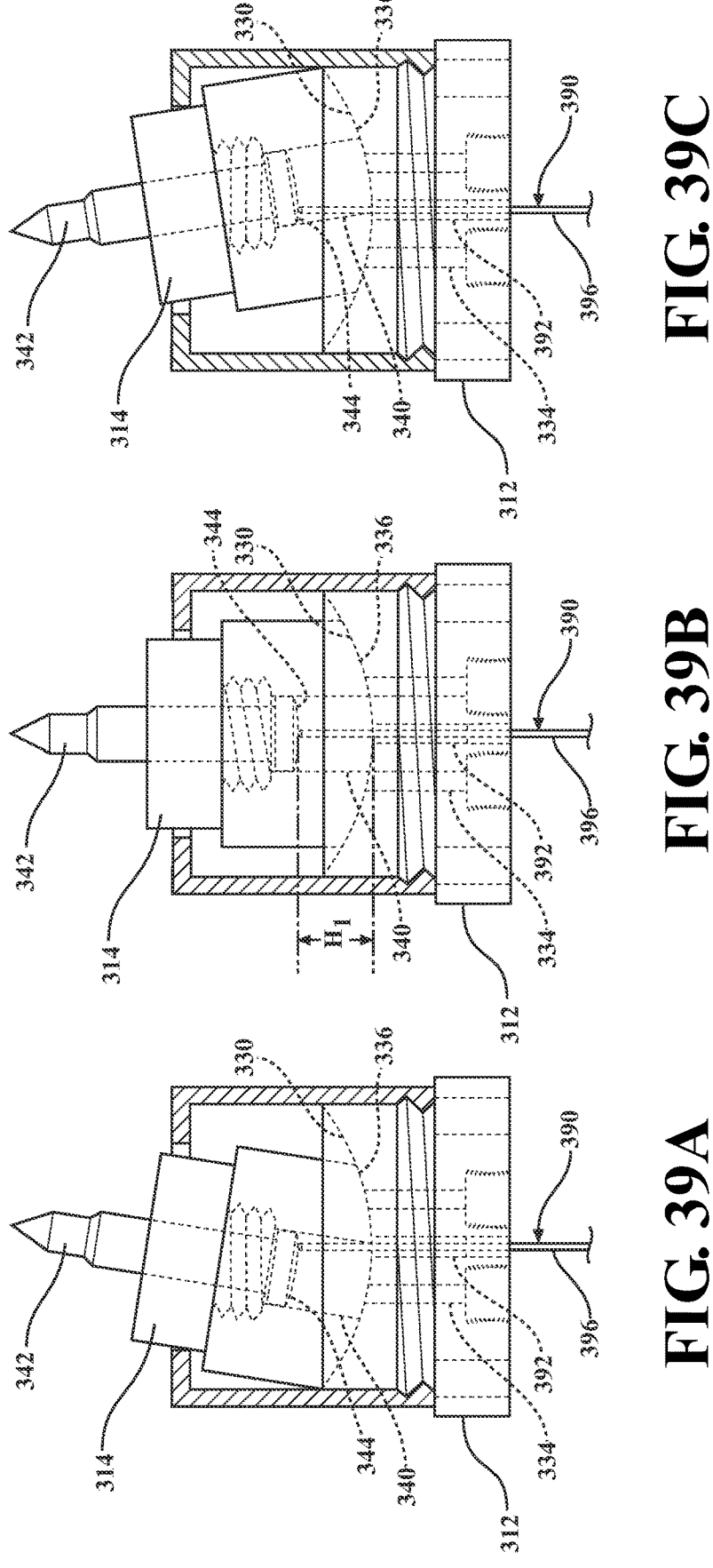
FIGS. 39A, 39B, and 39C are cross-sectional views of the base electrode of FIG. 34 and illustrating the weld pin and base swivel in different orientations but at a first height of the weld pin within the passage.
Figures 40A, 40B, 40C:
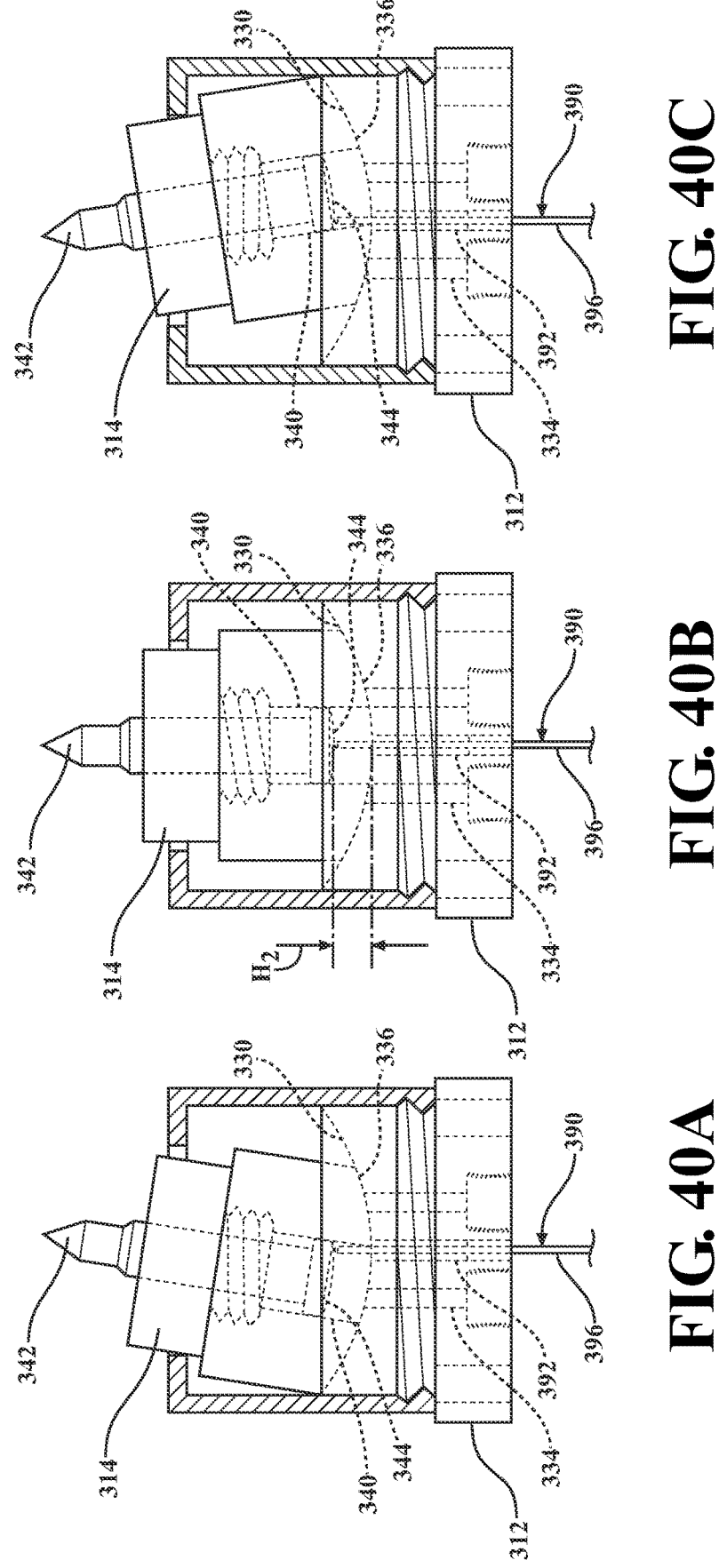
FIGS. 40A, 40B, and 40C are cross-sectional views of the base electrode of FIG. 34 and illustrating the weld pin and base swivel in different orientations but at a second height that is different than the first height.

Referring now to FIGS. 34-35, in an alternative arrangement of the sensing device 290, 390, rather than being a fiber optic sensor, the sensing device 392 is comprised of a touch probe 396 or linear variable differential transformer (LVDT) that extends through the instrument channel 392 and into the passage 340 in the base electrode 386 to directly contact the curved, convex bottom surface (i.e., bulging end 344) of the weld pin 342. As shown in FIGS. 39-41, in operation, a change in the height of the weld pin 342 relative to a fixed point on the base 312 affects the position of the touch probe 396; however, articulation of the weld pin 342 without an accompanying change in height will not affect the movement of the touch probe 396. For example, FIGS. 39A-C show the weld pin 342 at a first height $H_1$, accompanied by corresponding linear or axial movement of the touch probe 396; FIGS. 40A-C show the weld pin 342 at a lower, second height $H_2$, accompanied by corresponding linear or axial movement of the touch probe 396; and FIGS. 41A-C show the weld pin 342 at a still lower, third height $H_3$, accompanied by corresponding linear or axial movement of the touch probe 396. Thus, as shown in FIGS. 39-41, the touch probe 396 remains in continuous contact with the bulging, bottom weld pin end 344 of the weld pin 342 during all pivoting and rotational movement of the base electrode 314 and all linear or translational movement (and thus all heights $H_1$, $H_2$, $H_3$) of the weld pin 342 within the passage 340. Thus, the touch probe 396 can always sense a position of the weld pin 342 within the passage 340 of the base electrode 314 as determined by the linear or axial position of the touch probe 396 within the instrument channel 392 and passage 340. In other words, the change in the height or position of the weld pin 342 correspondingly raises or lowers the touch probe 396 which is connected to either an LVDT or similar scaled measuring device to determine the position of the weld pin 342. A radius of the weld pin 342 also allows the weld pin 342 to swivel without changing the position of the touch probe 396 if there is no linear or axial movement of the weld pin 342.

In some embodiments, a different type of sensing device 290, 390 that can sense the position of the weld pin within the base electrode may be employed. Such alternate embodiments may utilize, for example, an ultrasonic sensor.

Unless otherwise defined, the term "hemispherical," as used in the present application, includes any surface extending along a portion of a sphere. The term "hemispherical" is not limited to exactly one-half of a sphere shape.

The foregoing description is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A spot welding assembly comprising:
a base;
a base electrode coupled with said base for supporting a first work piece;
a welding gun movable toward and away from said base along an axis A;
a gun electrode coupled with said welding gun for supporting a second work piece and for locating the second work piece against the first work piece upon movement of said welding gun toward said base to allow the first and second work pieces to be welded to one another;
said base electrode being pivotable relative to said base and presenting a convex hemispherical base electrode portion disposed in mating and pivotable relationship with a concave hemispherical base portion of said base;

said base electrode defining a passage extending axially through said base electrode to said convex hemispherical base electrode portion, and
a weld pin disposed within said passage and extending from a bottom weld pin end disposed adjacent said convex hemispherical base electrode portion to a tip.

2. The spot welding assembly as set forth in claim 1, wherein said base includes a base collar having a base flange extending radially inwardly to a cylindrical shaped base stop disposed adjacent to and in radially spaced relationship with said base electrode for limiting the pivoting movement of said base electrode.

3. The spot welding assembly as set forth in claim 2, wherein said cylindrical shaped base stop is configured to limit the pivoting movement of said base electrode to approximately 15 degrees defined relative to the axis A.

4. The spot welding assembly as set forth in claim 1, wherein said base defines a plurality of wire channels extending in spaced relationship with one another and each terminating at said convex hemispherical base electrode portion for receiving one or more wires and disposing the one or more wires in electrical contact with said concave hemispherical base portion of said base electrode throughout an entire range of pivotable motion of said base electrode.

5. The spot welding assembly as set forth in claim 1, wherein said gun electrode being pivotable relative to said welding gun.

6. The spot welding assembly as set forth in claim 1, wherein said bottom weld pin end of said weld pin being convex shaped complementary to said convex hemispherical base electrode portion of said base electrode for engaging and being pivotable along said concave hemispherical base portion of said base in a neutral position of said weld pin and during said pivoting movement of said base electrode.

7. The spot welding assembly as set forth in claim 1, wherein said weld pin is translatable along said passage and a sensing device is disposed below said base electrode for sensing a position of said weld pin within said passage.

8. The spot welding assembly as set forth in claim 7, wherein said base defining an instrument channel extending along said axis and disposed in communication with said passage, and said sensing device disposed in communication with said instrument channel and said passage for sensing a position of said weld pin.

9. The spot welding assembly as set forth in claim 8, wherein said sensing device is comprised of a fiber optic sensor positioned in said instrument channel of said base and configured to emit a light beam serially through said instrument channel and said passage and into contact with said bottom weld pin end to determine a position of said weld pin within said passage.

10. The spot welding assembly as set forth in claim 9, wherein said bottom weld pin end being highlighted for improving an ability of said fiber optic sensor to determine a position of said weld pin within said passage.

11. The spot welding assembly as set forth in claim 8, wherein said sensing device is comprised of a touch probe extending through said instrument channel and into said passage and into continuous abutting relationship with said bottom weld pin end during an entire range of pivoting movement of said base electrode to sense a position of said weld pin.

12. The spot welding assembly as set forth in claim 1, wherein said base electrode being made of two pieces that are detachably joined together.

13. The spot welding assembly as set forth in claim 12, wherein said base electrode is comprised of a base cap and a base swivel threadingly coupled with one another.

14. The spot welding assembly as set forth in claim 1, wherein said bottom weld pin end being planar shaped.

15. The spot welding assembly as set forth in claim 1, wherein said weld pin comprised of high carbon steel material coated with a black oxide or a diamond-like carbon material to reduce arcing during a welding operation.

16. The spot welding assembly as set forth in claim 5, wherein said gun electrode is comprised of a gun cap and a gun swivel threadingly coupled with one another.

17. The spot welding assembly as set forth in claim 2, wherein said base collar is threadingly connected to said base.

18. The spot welding assembly as set forth in claim 5, wherein said gun electrode presenting a convex hemispherical gun electrode portion disposed in mating and pivotable relationship with a concave hemispherical gun portion of said welding gun.

19. The spot welding assembly as set forth in claim 18, wherein said welding gun includes a gun collar having a gun flange extending radially inwardly to a cylindrical shaped gun stop disposed adjacent to and in radially spaced relationship with said gun electrode for limiting the pivoting movement of said gun electrode.

20. The spot welding assembly as set forth in claim 19, wherein said cylindrical shaped gun stop is configured to limit the pivoting movement of said gun electrode to approximately 15 degrees defined relative to the axis A.

\*  \*  \*  \*  \*